(12) United States Patent
Miyazaki

(10) Patent No.: US 9,969,221 B2
(45) Date of Patent: May 15, 2018

(54) PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 168 days.

(21) Appl. No.: 14/900,501

(22) PCT Filed: Jun. 13, 2014

(86) PCT No.: PCT/JP2014/065718
§ 371 (c)(1),
(2) Date: Dec. 21, 2015

(87) PCT Pub. No.: WO2015/001942
PCT Pub. Date: Jan. 8, 2015

(65) Prior Publication Data
US 2016/0368324 A1    Dec. 22, 2016

(30) Foreign Application Priority Data
Jul. 5, 2013    (JP) ................................. 2013-141963

(51) Int. Cl.
*B60C 11/00* (2006.01)
*B60C 1/00* (2006.01)
(Continued)

(52) U.S. Cl.
CPC .............. *B60C 11/005* (2013.01); *B60C 1/00* (2013.01); *B60C 1/0016* (2013.01); *B60C 11/00* (2013.01);
(Continued)

(58) Field of Classification Search
CPC . B60C 1/00; B60C 1/0016; B60C 2001/0066; B60C 2001/0075;
(Continued)

(56) References Cited

U.S. PATENT DOCUMENTS

| | | | |
|---|---|---|---|
| 5,343,917 A * | 9/1994 | Okihara ................ | B60C 9/2006 152/209.18 |
| 5,385,188 A * | 1/1995 | Kogure ................ | B60C 9/2009 152/209.18 |

(Continued)

FOREIGN PATENT DOCUMENTS

| JP | 63-213536 A | 9/1988 |
|---|---|---|
| JP | 5-179071 A | 7/1993 |

(Continued)

OTHER PUBLICATIONS

International Search Report issued in PCT/JP2014/065718 dated Sep. 2, 2014.
(Continued)

*Primary Examiner* — Eric Hug
(74) *Attorney, Agent, or Firm* — Birch, Stewart, Kolasch & Birch, LLP

(57) ABSTRACT

The present invention provides a pneumatic tire capable of preventing discoloration while exhibiting good TGC resistance even after the tire having a reduced sub-tread thickness at the base of the tread main groove is stored. The present invention relates to a pneumatic tire including a tread portion, the tread portion including a jointless band and at least two tire components selected from the group consisting of a cap tread, a base tread, and an undertread, the rubber composition for cap treads having an amount of phenylenediamine antioxidant of a specific value or less, the cap tread, the base tread, the undertread, and the upper layer of the jointless band having amounts of phenylenediamine antioxidant satisfying a specific relational expression, the rubber
(Continued)

composition for undertreads containing a specific amount of sulfur, the pneumatic tire having a sub-tread thickness at the base of the tread main groove of 0.5 to 2.0 mm.

9 Claims, 1 Drawing Sheet

(51) Int. Cl.
　　*C08K 5/18* (2006.01)
　　*C08L 21/00* (2006.01)
　　*C08K 3/04* (2006.01)
　　*C08K 3/22* (2006.01)
　　*C08L 65/00* (2006.01)
　　*C08L 79/04* (2006.01)

(52) U.S. Cl.
　　CPC ............... *C08K 3/04* (2013.01); *C08K 3/22* (2013.01); *C08K 5/18* (2013.01); *C08L 21/00* (2013.01); *C08L 65/00* (2013.01); *C08L 79/04* (2013.01); *B60C 2011/0033* (2013.01); *C08K 2003/2296* (2013.01)

(58) Field of Classification Search
　　CPC ............. B60C 2001/0083; B60C 11/00; B60C 11/0008; B60C 11/0041; B60C 11/005; B60C 2011/0033; C08L 21/00
　　USPC .................................. 152/209.1, 209.5, 905
　　See application file for complete search history.

(56) References Cited

U.S. PATENT DOCUMENTS

| | | | | |
|---|---|---|---|---|
| 2003/0111770 | A1* | 6/2003 | Bohm | C08J 3/203 264/349 |
| 2009/0005481 | A1* | 1/2009 | Ishida | B60C 1/0016 524/301 |
| 2014/0373989 | A1* | 12/2014 | Hirayama | B60C 1/0016 152/209.1 |

FOREIGN PATENT DOCUMENTS

| | | |
|---|---|---|
| JP | H05-179071 A | 7/1993 |
| JP | 5-194790 A | 8/1993 |
| JP | H05-194790 A | 8/1993 |
| JP | 7-40703 A | 2/1995 |
| JP | 7-96715 A | 4/1995 |
| JP | 07-096715 A | 4/1995 |
| JP | 2002-146109 A | 5/2002 |
| JP | 2002-338749 A | 11/2002 |
| JP | 2004-42786 A | 2/2004 |
| JP | 2004-042786 A | 2/2004 |
| JP | 2008-31209 A | 2/2008 |
| JP | 2008-213635 A | 9/2008 |
| JP | 2010-59327 A | 3/2010 |
| JP | 2011-57892 A | 3/2011 |
| JP | 2011-057892 A | 3/2011 |
| JP | 2011-132471 A | 7/2011 |
| JP | 2011-132473 A | 7/2011 |
| JP | 2012-091733 A | 5/2012 |
| JP | 2012-91733 A | 5/2012 |
| JP | 2013-87266 A | 5/2013 |

OTHER PUBLICATIONS

International Preliminary Report on Patentability and Written Opinion of the International Searching Authority (Forms PCT/IB/338, PCT/IB/373 and PCT/ISA/237) for International Application No. PCT/JP2014/065718, dated Jan. 14, 2016.

Smithers Rapra Inc., "Tire Specification No. 1444-IT," Jun. 15, 2011, 8 pages.

* cited by examiner (a)
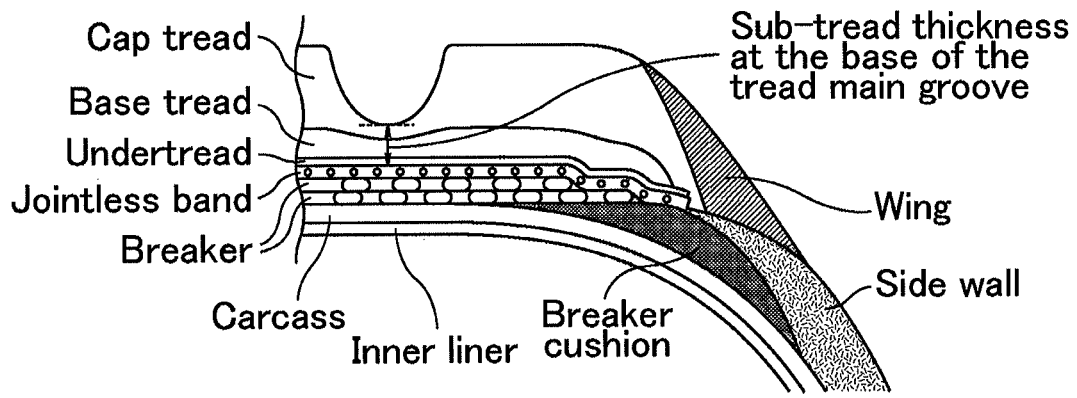
(b)
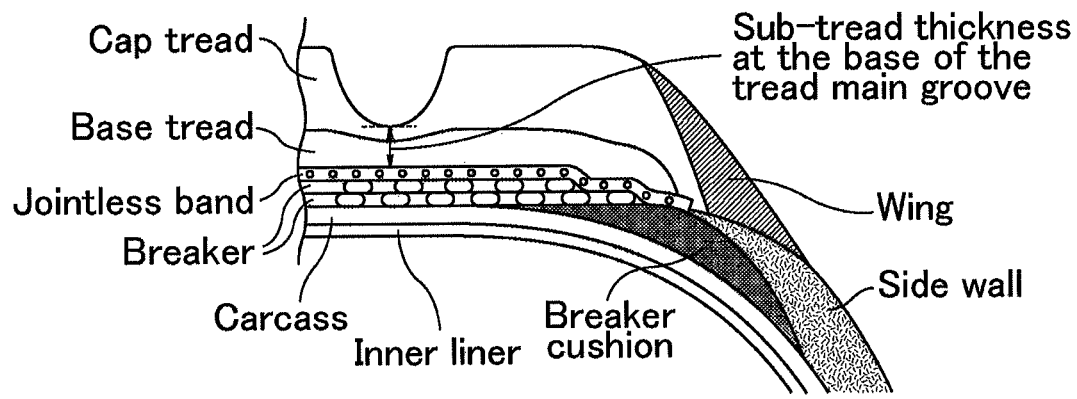
(c)
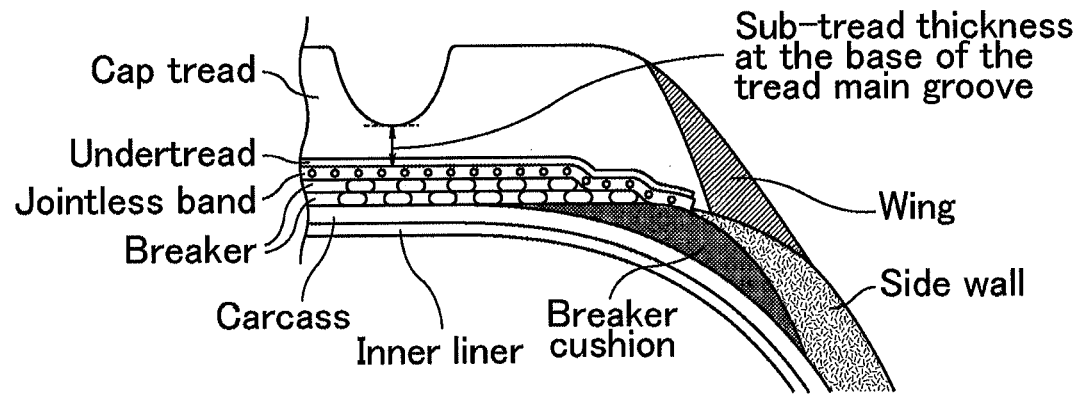

PNEUMATIC TIRE

TECHNICAL FIELD

The present invention relates to a pneumatic tire.

BACKGROUND ART

Since automobile tires are manufactured using rubber compositions made from natural rubber and/or synthetic diene rubbers, degradation of such tires is accelerated at high ozone concentrations or under ultraviolet rays, which may cause cracking, for example, tread groove cracking (TGC) at the base of the main grooves of the tread. In order to suppress crack formation and growth in the presence of ozone, for example, additives such as antioxidants, e.g., N-(1,3-dimethylbutyl)-N'-phenyl-p-phenylenediamine (6PPD) or poly(2,2,4-trimethyl-1,2-)dihydroquinoline (TMDQ), or petroleum wax are used in rubber compositions.

The antioxidants and petroleum wax in rubber vulcanizates migrate (bloom) to the rubber surface of, for example, tires during vulcanization or service, thereby serving to protect the rubbers from ozone. However, if the antioxidants and petroleum wax are excessively added beyond the solubility of the rubber, they excessively bloom during the initial service period, causing white discoloration. Moreover, the antioxidants oxidized by ozone cause brown discoloration, and similar excessive blooming of them intensifies brown discoloration. Thus, it has been difficult to suppress crack formation while preventing discoloration.

With the recent increased demand for lighter weight tires, the sub-tread thickness at the base of the tread main grooves is being reduced to reduce tire weight. Unfortunately, however, the lighter tires are more likely to suffer from TGC during storage at tire dealers, stores, or the like. TGC is more likely to occur particularly when tires are stored in a state where the rubber at the base of the tread main grooves is strained such as, for example, when tires (10 to 15 tires) are stacked flat (horizontally) on each other or tires are forced into a narrow upright storage rack space so that they are deformed; or when they are stored in a high ozone environment such as, for example, in a dry season, around an ozone deodorizer or electric sparks produced by a rotating motor, or the like. Presumably, as the sub-tread thickness at the base of the tread main grooves is reduced, the rubber at the base of the tread main grooves is more likely to be strained and therefore TGC is more likely to occur during storage.

Patent Literature 1 describes that the addition of a polyoxyethylene ether nonionic surfactant prevents deterioration of the appearance of tires. This technique still leaves room for improvement in terms of preventing discoloration while exhibiting good TGC resistance even after the tire having a reduced sub-tread thickness at the base of the tread main groove is stored.

CITATION LIST

Patent Literature

Patent Literature 1: JP H05-194790 A

SUMMARY OF INVENTION

Technical Problem

The present invention aims to solve the above problems and provide a pneumatic tire capable of preventing discoloration while exhibiting good TGC resistance even after the tire having a reduced sub-tread thickness at the base of the tread main groove is stored.

Solution to Problem

The present invention relates to a pneumatic tire, including a tread portion, the tread portion including a jointless band and at least two tire components selected from the group consisting of a cap tread, a base tread, and an undertread, the cap tread, the base tread, and the undertread being formed from a rubber composition for cap treads, a rubber composition for base treads, and a rubber composition for undertreads, respectively, the jointless band including fiber cords coated with a rubber composition for fiber cord toppings, the rubber composition for cap treads having an amount of phenylenediamine antioxidant of 1.8% by mass or less, the cap tread, the base tread, the undertread, and an upper layer of the jointless band having amounts of phenylenediamine antioxidant satisfying Expression (I) below, the rubber composition for undertreads containing, per 100 parts by mass of a rubber component, 1.8 to 6.0 parts by mass of sulfur, the pneumatic tire having a sub-tread thickness at the base of a tread main groove of 0.5 to 2.0 mm, $$1.35 \leq \{(\text{rubber thickness (mm) of cap tread at base of tread main groove}) \times (\text{amount (\% by mass) of phenylenediamine antioxidant in rubber composition for cap treads}) + (\text{rubber thickness (mm) of base tread at base of tread main groove}) \times (\text{amount (\% by mass) of phenylenediamine antioxidant in rubber composition for base treads}) + (\text{rubber thickness (mm) of undertread at base of tread main groove}) \times (\text{amount (\% by mass) of phenylenediamine antioxidant in rubber composition for undertreads}) + (\text{rubber thickness (mm) of upper layer of jointless band at base of tread main groove}) \times (\text{amount (\% by mass) of phenylenediamine antioxidant in rubber composition for fiber cord toppings})\} / (\text{sub-tread thickness (mm) at base of tread main groove})$$ Expression (I).

In the pneumatic tire, preferably, the tread portion includes the cap tread, the base tread, and the jointless band.

In the pneumatic tire, preferably, at least one of the base tread or the undertread has a rubber thickness at the base of a tread main groove of 0.1 to 1.5 mm.

Preferably, at least one of the rubber composition for base treads or the rubber composition for undertreads contains substantially no cobalt metal.

Preferably, at least one of the rubber composition for base treads or the rubber composition for undertreads contains, per 100 parts by mass of a rubber component, 0.1 to 5.0 parts by mass of a phenolic resin.

Preferably, at least one of the rubber composition for cap treads or the rubber composition for base treads contains, per 100 parts by mass of a rubber component, 0.01 to 5.0 parts by mass of a nonionic surfactant.

Preferably, the nonionic surfactant is at least one selected from the group consisting of a Pluronic-type nonionic surfactant and at least one of nonionic surfactants represented by the following Formula (1) or Formula (2):

$$R^1 \underset{O}{\overset{O}{\|}} (O \frown)_d OH \quad (1)$$

wherein $R^1$ represents a C6-C26 hydrocarbon group, and d represents an integer;

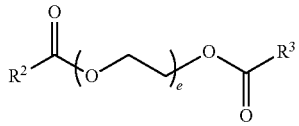

(2)

wherein $R^2$ and $R^3$ are the same or different and each represent a C6-26 hydrocarbon group, and e represents an integer.

Preferably, at least one of the rubber composition for base treads or the rubber composition for undertreads contains, per 100 parts by mass of a rubber component, 0.1 to 5.0 parts by mass of a naturally occurring wax containing 40 to 98% by mass of an ester component.

Preferably, the naturally occurring wax is extracted from a gramineous plant and includes a component having a softening point of 60° C. to 90° C.

Advantageous Effects of Invention

The pneumatic tire of the present invention includes a tread portion including a jointless band and at least two tire components selected from the group consisting of a cap tread, abase tread, and an undertread. The cap tread, the base tread, and the undertread are formed from a rubber composition for cap treads, a rubber composition for base treads, and a rubber composition for undertreads, respectively. The jointless band includes fiber cords coated with a rubber composition for fiber cord toppings. The rubber composition for cap treads has an amount of phenylenediamine antioxidant of 1.8% by mass or less. The cap tread, the base tread, the undertread, and the upper layer of the jointless band have amounts of phenylenediamine antioxidant satisfying a specific relational expression. The rubber composition for undertreads contains, per 100 parts by mass of the rubber component, 1.8 to 6.0 parts by mass of sulfur. Such a tire is prevented from discoloration while exhibiting good TGC resistance even after the tire having a sub-tread thickness at the base of the tread main groove of as small as 0.5 to 2.0 mm is stored.

BRIEF DESCRIPTION OF DRAWINGS

FIG. 1(a) is a cross-sectional view schematically illustrating an example of a tire.

FIG. 1(b) is a cross-sectional view schematically illustrating an example of a tire.

FIG. 1(c) is a cross-sectional view schematically illustrating an example of a tire.

DESCRIPTION OF EMBODIMENTS

The pneumatic tire of the present invention includes a tread portion including a jointless band and at least two tire components selected from the group consisting of a cap tread, abase tread, and an undertread. The cap tread, the base tread, and the undertread are formed from a rubber composition for cap treads, a rubber composition for base treads, and a rubber composition for undertreads, respectively, and the jointless band includes fiber cords coated with a rubber composition for fiber cord toppings. The rubber composition for cap treads has an amount of phenylenediamine antioxidant of 1.8% by mass or less. The cap tread, the base tread, the undertread, and the upper layer of the jointless band have amounts of phenylenediamine antioxidant satisfying a specific relational expression. The rubber composition for undertreads contains, per 100 parts by mass of the rubber component, 1.8 to 6.0 parts by mass of sulfur. The pneumatic tire has a sub-tread thickness at the base of the tread main groove of 0.5 to 2.0 mm. In such a tire, the amount of blooms of antioxidants on the tread surface is adjusted to a moderate amount, as a result of which excellent ozone resistance over a wide temperature range and good TGC resistance can be obtained, and at the same time brown discoloration and white discoloration can be sufficiently prevented. Thus, the pneumatic tire of the present invention is prevented from discoloration while exhibiting good TGC resistance even after the tire having a reduced sub-tread thickness at the base of the tread main groove is stored.

The pneumatic tire of the present invention includes a tread portion, and the tread portion includes a jointless band and at least two tire components selected from the group consisting of a cap tread, a base tread, and an undertread. The tread portion preferably includes a jointless band, a cap tread, and at least one tire component selected from the group consisting of a base tread and an undertread, and more preferably includes a cap tread, a base tread, and a jointless band.

The cap tread is a component formed from a rubber composition for cap treads and is the outer surface layer of a tread portion having a multilayer structure. This component contacts the ground.

The base tread is a component formed from a rubber composition for base treads and is located between a cap tread and an undertread or a jointless band as shown in FIG. 1 of JP 2010-095705 A or the like. Specifically, (i) in the case of a tire including an undertread, the base tread is a component located between the undertread and a cap tread (see FIG. 1(a)), and (ii) in the case of a tire including no undertread, the base tread is a component located between a jointless band and a cap tread (see FIG. 1(b)).

The undertread is a component formed from a rubber composition for undertreads and is located between a jointless band and a cap tread or a base tread, covering the radially outer side of the jointless band or a breaker in the tire as shown specifically in FIG. 1 of JP 2009-191132 A or the like. Specifically, (iii) in the case of a tire including a base tread, the undertread is a component located between the base tread and a jointless band (see FIG. 1(a)), and (iv) in the case of a tire including no base tread, the undertread is a component located between a jointless band and a cap tread (see FIG. 1(c)). The same component is called either base tread or undertread, depending on the tire manufacturer. In fact, in the cases (ii) and (iv), the component located between the jointless band and the cap tread cannot be identified as a base tread or an undertread. In the present specification, the component located between the jointless band and the cap tread in such cases is regarded as a base tread.

The jointless band is a component including fiber cords coated with a rubber composition for fiber cord toppings and is provided outwardly from a breaker in the radial direction of the tire to inhibit the entire tread portion from being lifted from a carcass (package below the tread portion) due to the centrifugal force of the tire during traveling of the vehicle. Specifically, it is a component shown in FIG. 3 of JP 2009-007437 A or the like.

In the present invention, the tire in which the tread portion has no undertread and includes a cap tread, a base tread, and a jointless band is prevented from discoloration while exhibiting good TGC resistance even after the tire having a reduced sub-tread thickness at the base of the tread main groove is stored (see FIG. 1 (b)).

The undertread and the jointless band as used herein are also referred to as U/T and JLB, respectively.

In the pneumatic tire of the present invention, the sub-tread thickness at the base of the tread main groove is 0.5 to 2.0 mm, preferably 0.6 to 1.8 mm, more preferably 0.7 to 1.6 mm. If the sub-tread thickness at the base of the tread main groove is more than 2.0 mm, the weight of the tire increases so that fuel economy is deteriorated. Conversely, if the sub-tread thickness is less than 0.5 mm, the tire is more likely to be cut or chipped and damaged by stones on the road surface.

Having a specific configuration, the pneumatic tire of the present invention is prevented from discoloration while exhibiting good TGC resistance even after the tire having a sub-tread thickness at the base of the tread main groove of as small as the above range is stored.

The base of the tread main groove as used herein refers to a groove for drainage formed in the tread in the circumferential direction of the tire, and corresponds to, for example, the first longitudinal main grooves 12 and the second longitudinal main grooves 13 in the tread pattern of the pneumatic tire illustrated in FIG. 1 of JP 2006-069305 A.

The sub-tread thickness at the base of the tread main groove as used herein refers to the thickness in the radial direction of the tire from the groove bottom surface of the base of the tread main groove to the surface of the fiber cords in the jointless band in the case of the tire including a jointless band, or to the surface of the steel cords in the breaker in the case of the tire including no jointless band.

The base tread and/or the undertread preferably has a rubber thickness at the base of the tread main groove of 0.1 to 1.5 mm. With this configuration, fuel economy and building tack can be more suitably achieved.

The rubber thickness of the base tread at the base of the tread main groove is more preferably 0.15 to 1.0 mm, still more preferably 0.2 to 0.5 mm.

The rubber thickness of the undertread at the base of the tread main groove is more preferably 0.15 to 1.0 mm, still more preferably 0.2 to 0.7 mm.

The rubber thickness of the base tread at the base of the tread main groove as used herein refers to the rubber thickness of the base tread located on a line extending inwardly from the groove bottom surface of the base of the tread main groove in the radial direction of the tire.

The rubber thickness of the undertread at the base of the tread main groove as used herein refers to the rubber thickness of the undertread located on a line extending inwardly from the groove bottom surface of the base of the tread main groove in the radial direction of the tire.

The cap tread preferably has a rubber thickness at the base of the tread main groove of 0.1 to 1.5 mm, more preferably 0.15 to 1.0 mm, still more preferably 0.2 to 0.8 mm. With this configuration, the effects of the present invention can be more suitably achieved.

The rubber thickness of the cap tread at the base of the tread main groove as used herein refers to the rubber thickness of the cap tread located on a line extending inwardly from the groove bottom surface of the base of the tread main groove in the radial direction of the tire.

The upper layer of the jointless band preferably has a rubber thickness at the base of the tread main groove of 0.03 to 1.0 mm, more preferably 0.05 to 0.5 mm, still more preferably 0.07 to 0.3 mm. With this configuration, the effects of the present invention can be more suitably achieved.

The rubber thickness of the upper layer of the jointless band at the base of the tread main groove as used herein refers to the rubber thickness of the upper layer of the jointless band located on a line extending inwardly from the groove bottom surface of the base of the tread main groove in the radial direction of the tire.

Moreover, the rubber thickness of the upper layer of the jointless band means the thickness of the topping rubber of the jointless band extending from the surface of the fiber cords in the jointless band toward the tread surface.

In the pneumatic tire of the present invention, the cap tread, the base tread, the undertread, and the upper layer of the jointless band have amounts of phenylenediamine antioxidant satisfying Expression (I) below. Such a pneumatic tire is prevented from discoloration while exhibiting good TGC resistance even after the tire having a reduced sub-tread thickness at the base of the tread main groove is stored.

The total amount of phenylenediamine antioxidant in Expression (I) is preferably 1.40 or more, more preferably 1.50 or more, still more preferably 1.60 or more, particularly preferably 1.80 or more, most preferably 2.00 or more. The upper limit of the total amount of phenylenediamine antioxidant in Expression (I) is not particularly limited, and is preferably 6.0 or less, more preferably 5.0 or less, still more preferably 2.4 or less. If the total amount is more than 6.0, brown discoloration may occur.

$$1.35 \leq \{(\text{rubber thickness (mm) of cap tread at base of tread main groove}) \times (\text{amount (\% by mass) of phenylenediamine antioxidant in rubber composition for cap treads}) + (\text{rubber thickness (mm) of base tread at base of tread main groove}) \times (\text{amount (\% by mass) of phenylenediamine antioxidant in rubber composition for base treads}) + (\text{rubber thickness (mm) of undertread at base of tread main groove}) \times (\text{amount (\% by mass) of phenylenediamine antioxidant in rubber composition for undertreads}) + (\text{rubber thickness (mm) of upper layer of jointless band at base of tread main groove}) \times (\text{amount (\% by mass) of phenylenediamine antioxidant in rubber composition for fiber cord toppings})\} / (\text{sub-tread thickness (mm) at base of tread main groove}) = (\text{total amount of phenylenediamine antioxidant}) \quad \text{Expression (I)}$$

Examples of the phenylenediamine antioxidant include N-(1,3-dimethylbutyl)-N'-phenyl-p-phenylenediamine, N-1,4-dimethylpentyl-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine. Preferred among these is N-(1,3-dimethylbutyl)-N'-phenyl-p-phenylenediamine.

A quinone antioxidant may be used together with the phenylenediamine antioxidant. Examples of the quinone antioxidant include benzoquinone antioxidants, hydroquinone antioxidants, catechol antioxidants, quinonediimine antioxidants, quinomethane antioxidants, and quinodimethane antioxidants. Preferred among these are quinonediimine antioxidants.

Examples of the quinonediimine antioxidants include N-isopropyl-N'-phenyl-p-quinonediimine, N-(1,3-dimethylbutyl)-N'-phenylquinonediimine, N,N'-diphenyl-p-quinonediimine, N-cyclohexyl-N'-phenyl-p-quinonediimine, N-n-hexyl-N'-phenyl-p-quinonediimine, and N,N'-dioctyl-p-quinonediimine. Preferred among these is N-(1,3-dimethylbutyl)-N'-phenylquinonediimine (6QDI).

Next, a description is given on the cap tread, the base tread, the undertread, and the jointless band.

(Cap Tread)

As mentioned above, the cap tread is a component formed from a rubber composition for cap treads.

Example of the rubber component usable in the rubber composition for cap treads include: diene rubbers such as isoprene-based rubbers, styrene-butadiene rubber (SBR), polybutadiene rubber (BR), styrene-isoprene-butadiene rubber (SIBR), chloroprene rubber (CR), or acrylonitrile-butadiene rubber (NBR); and non-diene rubbers such as ethylene-propylene-diene rubber (EPDM), butyl rubber (IIR) or halogenated butyl rubber (X-IIR). Each of these may be used alone, or two or more of these may be used in combination. Among these, diene rubbers are preferred because they can be suitably used for cap treads. Further, among diene rubbers, isoprene-based rubbers and SBR are preferred, and combinations of SBR with isoprene-based rubbers are more preferred, because they provide good handling stability, good fuel economy, good elongation at break, good durability, and good wet-grip performance.

The amount of diene rubber based on 100% by mass of the rubber component is preferably 70% by mass or more, more preferably 80% by mass or more, still more preferably 90% by mass or more, and may be 100% by mass. The rubber composition containing the above amount of diene rubber can suitably enjoy the effects of the present invention and can also be suitably used as a rubber composition for cap treads.

Examples of isoprene-based rubbers include synthetic polyisoprene rubber (IR), natural rubber (NR), and modified natural rubber. Examples of NR include deproteinized natural rubber (DPNR) and high purity natural rubber (HPNR). Examples of modified natural rubber include epoxidized natural rubber (ENR), hydrogenated natural rubber (HNR), and grafted natural rubber. Moreover, the NR may be one commonly used in the tire industry, for example, SIR20, RSS#13, TSR20, or the like. Among these, NR or IR is preferred, and NR is more preferred.

The amount of isoprene-based rubber may be 0% by mass. In the case of the rubber composition containing an isoprene-based rubber, the amount of isoprene-based rubber based on 100% by mass of the rubber component is preferably 10% by mass or more, more preferably 20% by mass or more. If the amount is less than 10% by mass, sufficient processability or mechanical strength may not be obtained. The amount of isoprene-based rubber is preferably 80% by mass or less, more preferably 70% by mass or less. If the amount is more than 80% by mass, wet-grip performance may be reduced. If emphasis is placed on grip performance, the amount of isoprene-based rubber is preferably 40% by mass or less.

Any SBR may be used, and examples include emulsion-polymerized SBR (E-SBR), solution-polymerized SBR (S-SBR), and modified SBR having been modified with a primary amino group or the like.

The amount of SBR may be 0% by mass. In the case of the rubber composition containing SBR, the amount of SBR based on 100% by mass of the rubber component is preferably 10% by mass or more, more preferably 20% by mass or more. If the amount is less than 10% by mass, wet-grip performance may be reduced. The amount of SBR is preferably 100% by mass or less, more preferably 90% by mass or less, still more preferably 80% by mass or less. If the amount is 100% by mass, sufficient abrasion resistance or performance on snow may not be obtained.

Although the combined amount of isoprene-based rubber and SBR may be 0% by mass, the combined amount of isoprene-based rubber and SBR based on 100% by mass of the rubber component is preferably 70% by mass or more, more preferably 80% by mass or more, and may be 100% by mass. In such case, good wet-grip performance, good handling stability, good fuel economy, good elongation at break, good abrasion resistance, good durability, and good crack growth resistance can be obtained.

In the rubber composition for cap treads, the amount of phenylenediamine antioxidant based on 100% by mass of the rubber composition for cap treads is 1.8% by mass or less, preferably 1.7% by mass or less, more preferably 1.5% by mass or less, still more preferably 1.4% by mass or less, particularly preferably 1.3% by mass or less, most preferably 1.2% by mass or less, even most preferably 1.1% by mass or less. If the amount is more than 1.8% by mass, a discoloration problem arises. The amount is preferably 0.8% by mass or more, more preferably 0.85% by mass or more, still more preferably 0.9% by mass or more. If the amount is less than 0.8% by mass, sufficient TGC resistance may not be obtained.

In the present invention, the rubber composition for cap treads preferably contains a nonionic surfactant.

The specific surfactant blooms to the tire surface together with wax and antioxidants and melts and flattens them, as a result of which white discoloration can be diminished and, at the same time, the irregularities of the surface-protecting layer formed on the tire surface are reduced so that brown discoloration, which is noticeable under diffuse reflection, can be greatly diminished. Further, a shiny black luster is imparted to the tire surface. In addition, ozone resistance and TGC resistance can be improved.

The nonionic surfactant is not particularly limited, and examples include nonionic surfactants represented by Formula (1) and/or by Formula (2) below; Pluronic-type nonionic surfactants; sorbitan fatty acid esters such as polyoxyethylene sorbitan monostearate, polyoxyethylene sorbitan monooleate, polyoxyethylene sorbitan monopalmitate, polyoxyethylene sorbitan trioleate, polyoxyethylene sorbitan tristearate, or polyoxyethylene sorbitan tripalmitate; and polyoxyethylene alkyl ethers such as polyoxyethylene dodecyl ether, polyoxyethylene lauryl ether, polyoxyethylene 2-ethylhexyl ether, polyoxyethylene oleyl ether, ethylene glycol dibutyl ether, ethylene glycol dilauryl ether, ethylene glycol di-2-ethylhexyl ether, or ethylene glycol dioleyl ether. Note that Pluronic-type nonionic surfactants are block copolymers based on ethylene oxide and propylene oxide. Each of these nonionic surfactants may be used alone, or two or more of these may be used in combination. In particular, the nonionic surfactant is preferably at least one selected from the group consisting of a Pluronic-type nonionic surfactant and a nonionic surfactant represented by Formula (1) below and/or nonionic surfactant represented by Formula (2) below, and more preferably a Pluronic-type nonionic surfactant, because the effects of the present invention can be more suitably achieved.

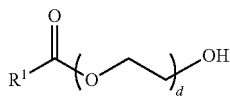

(1)

In Formula (1), $R^1$ represents a C6-C26 hydrocarbon group, and d represents an integer.

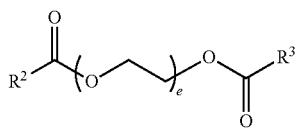

(2)

In Formula (2), $R^2$ and $R^3$ are the same or different and each represent a C6-C26 hydrocarbon group, and e represents an integer.

First, the nonionic surfactants represented by Formula (1) and/or by Formula (2) will be described. Among these surfactants, the nonionic surfactant represented by Formula (1) is preferred because the effects of the present invention can be more suitably achieved.

$R^1$ in Formula (1) represents a C6-C26 hydrocarbon group. If $R^1$ is a hydrocarbon group having 5 or less carbon atoms, such a nonionic surfactant poorly permeates through rubber and migrates to the rubber surface too fast, as a result of which the rubber surface tends to have poor appearance. Also, if $R^1$ is a hydrocarbon group having 27 or more carbon atoms, such a material is difficult to obtain or expensive and is thus inappropriate. When $R^1$ is a hydrocarbon group having a carbon number within the above range, blooming of the nonionic surfactant can be suitably controlled and the effects of the present invention can be more suitably achieved.

$R^1$ is preferably a hydrocarbon group having 8 to 24 carbon atoms, more preferably 10 to 22 carbon atoms, still more preferably 14 to 20 carbon atoms.

Examples of the C6-C26 hydrocarbon group as $R^1$ include C6-C26 alkenyl groups, C6-C26 alkynyl groups, and C6-C26 alkyl groups.

Examples of the C6-C26 alkenyl groups include 1-hexenyl, 2-hexenyl, 1-octenyl, decenyl, undecenyl, dodecenyl, tridecenyl, tetradecenyl, pentadecenyl, heptadecenyl, octadecenyl, icosenyl, tricosenyl, and hexacosenyl groups.

Examples of the C6-C26 alkynyl groups include hexynyl, heptynyl, octynyl, nonynyl, decynyl, undecynyl, dodecynyl, tridecynyl, tetradecynyl, pentadecynyl, heptadecynyl, octadecynyl, icosynyl, tricosynyl, and hexacosynyl groups.

Examples of the C6-C26 alkyl groups include hexyl, heptyl, 2-ethylhexyl, octyl, nonyl, decyl, undecyl, dodecyl, tridecyl, tetradecyl, pentadecyl, octadecyl, heptadecyl, octadecyl, icosyl, tricosyl, and hexacosyl groups.

$R^1$ is preferably a C6-C26 alkenyl group or a C6-C26 alkynyl group, more preferably a C6-C26 alkenyl group.

A nonionic surfactant with a greater d (integer) has a higher value of HLB, which shows hydrophile-lipophile balance, and tends to migrate faster to the rubber surface. In the present invention, the d value is not particularly limited, and may be appropriately chosen according to the service conditions, purpose, or the like. In particular, the d value is preferably 2 to 25, more preferably 4 to 20, still more preferably 8 to 16, particularly preferably 10 to 14.

Examples of the nonionic surfactant represented by Formula (1) include ethylene glycol monooleate, ethylene glycol monopalmeate, ethylene glycol monopalmitate, ethylene glycol monovaccenate, ethylene glycol monolinoleate, ethylene glycol monolinolenate, ethylene glycol monoarachidonate, ethylene glycol monostearate, ethylene glycol monocetylate, and ethylene glycol monolaurate. Each of these may be used alone, or two or more of these may be used in combination. In view of ready availability and cost, ethylene glycol monooleate, ethylene glycol monolaurate, ethylene glycol monostearate, and ethylene glycol monopalmitate are preferred among these.

$R^2$ and $R^3$ in Formula (2) are the same or different and each represent a C6-C26 hydrocarbon group. If $R^2$ or $R^3$ is a hydrocarbon group having 5 or less carbon atoms, such a nonionic surfactant poorly permeates through rubber and migrates to the rubber surface too fast, as a result of which the rubber surface tends to have poor appearance. If $R^2$ or $R^3$ is a hydrocarbon group having 27 or more carbon atoms, such a material is difficult to obtain or expensive and is thus inappropriate. When $R^2$ and $R^3$ are each a hydrocarbon group having a carbon number within the above range, blooming of the nonionic surfactant can be suitably controlled and the effects of the present invention can be more suitably achieved.

$R^2$ and $R^3$ are each preferably a hydrocarbon group having 8 to 24 carbon atoms, more preferably 10 to 22 carbon atoms, still more preferably 14 to 20 carbon atoms.

Examples of the C6-C26 hydrocarbon group as $R^2$ or $R^3$ include C6-C26 alkenyl groups, C6-C26 alkynyl groups, and C6-C26 alkyl groups.

Examples of the C6-C26 alkenyl groups, C6-C26 alkynyl groups, and C6-C26 alkyl groups include those groups mentioned for $R^1$ above.

$R^2$ and $R^3$ are each preferably a C6-C26 alkenyl group or a C6-C26 alkynyl group, more preferably a C6-C26 alkenyl group.

A nonionic surfactant with a greater e (integer) has a higher value of HLB, which shows hydrophile-lipophile balance, and tends to migrate faster to the rubber surface. In the present invention, the e value is not particularly limited, and may be appropriately chosen according to the service conditions, purpose, or the like. In particular, the e value is preferably 2 to 25, more preferably 4 to 20, still more preferably 8 to 16, particularly preferably 10 to 14.

Examples of the nonionic surfactant represented by Formula (2) include ethylene glycol dioleate, ethylene glycol dipalmeate, ethylene glycol dipalmitate, ethylene glycol divaccenate, ethylene glycol dilinoleate, ethylene glycol dilinolenate, ethylene glycol diarachidonate, ethylene glycol distearate, ethylene glycol dicetylate, and ethylene glycol dilaurate. Each of these may be used alone, or two or more of these may be used in combination. In view of ready availability and cost, ethylene glycol dioleate, ethylene glycol dilaurate, ethylene glycol distearate, and ethylene glycol dipalmitate are preferred among these.

The Pluronic-type nonionic surfactant will be described below.

The Pluronic-type nonionic surfactant is also called polyoxyethylene polyoxypropylene glycol, polyoxyethylene polyoxypropylene block polymer, or polypropylene glycol ethylene oxide adduct, and is generally a nonionic surfactant represented by Formula (I) below. As shown in Formula (I), the Pluronic-type nonionic surfactant contains on both sides thereof a hydrophilic group having an ethylene oxide structure, and also contains a hydrophobic group having a propylene oxide structure between the hydrophilic groups.

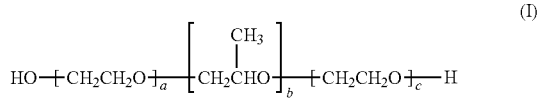
(I)

In Formula (I), a, b, and c each represent an integer.

The degree of polymerization of the polypropylene oxide block (b in Formula (I)) and the number of polyethylene oxide units added (a+c in Formula (I)) in the Pluronic-type nonionic surfactant are not particularly limited, and may be appropriately chosen according to the service conditions, purpose, or the like. A surfactant with a higher proportion of the polypropylene oxide block tends to have higher affinity for rubber and thus to migrate to the rubber surface at a slower rate. In particular, in order to suitably control blooming of the nonionic surfactant and more suitably achieve the effects of the present invention, the degree of polymerization of the polypropylene oxide block (b in Formula (I)) is preferably 100 or less, more preferably 10 to 70, still more preferably 10 to 60, particularly preferably 20 to 60, most preferably 20 to 45. For the same reason, the number of polyethylene oxide units added (a+c in Formula (I)) is preferably 100 or less, more preferably 3 to 65, still more preferably 5 to 55, particularly preferably 5 to 40, most preferably 10 to 40. When the degree of polymerization of the polypropylene oxide block and the number of polyethylene oxide units added are within the respective ranges described above, blooming of the nonionic surfactant can be suitably controlled and the effects of the present invention can be more suitably achieved.

Examples of the Pluronic-type nonionic surfactant include Pluronic series available from BASF Japan Ltd., Newpol PE series available from Sanyo Chemical Industries, Ltd., Adeka Pluronic L or F series available from Adeka Corporation, Epan series available from DKS Co. Ltd., and Pronon series or UNILUB available from NOF corporation. Each of these may be used alone, or two or more of these may be used in combination.

In the case of the rubber composition containing the nonionic surfactant, the amount of the nonionic surfactant (preferably, the combined amount of the nonionic surfactant represented by Formula (1), the nonionic surfactant represented by Formula (2), and the Pluronic-type nonionic surfactant) per 100 parts by mass of the rubber component is preferably 0.01 parts by mass or more, more preferably 0.1 parts by mass or more, still more preferably 0.3 parts by mass or more. If the amount is less than 0.01 parts by mass, sufficient TGC resistance or discoloration resistance may not be obtained. Also, the combined amount is preferably 5.0 parts by mass or less, more preferably 4.0 parts by mass or less, still more preferably 2.5 parts by mass or less, particularly preferably 2.0 parts by mass or less. If the amount is more than 5.0 parts by mass, stickiness may be increased excessively and result in a sticky tire tread surface, and the bloom layer can be easily eluted away during running in the rain or in a test run on a wet road, which may rather result in deteriorated TGC resistance.

In the present invention, the rubber composition for cap treads preferably contains a petroleum-derived wax. This provides good TGC resistance.

The petroleum-derived wax may be any of waxes derived from petroleum resources, including, for example, paraffin wax and microcrystalline wax. In particular, for excellent ozone resistance over a wide temperature range, the petroleum-derived wax preferably contains C20 to C32 normal alkanes. The petroleum-derived wax may be used alone or in combinations of two or more.

The petroleum-derived wax containing C20 to C32 normal alkanes is not particularly limited, and may be, for example, a petroleum-derived wax containing a predetermined amount of C20 to C55 normal alkanes. In particular, for excellent ozone resistance, the petroleum-derived wax may suitably be a wax having a normal alkane content of 70% by mass or more, more suitably 80% by mass or more.

The combined amount of C20 to C32 normal alkanes based on 100% by mass of the petroleum-derived wax is preferably 25% by mass or more, more preferably 35% by mass or more. If the combined amount is less than 25% by mass, sufficient ozone resistance may not be obtained at a temperature range of 20° C. or lower. The combined amount is preferably 90% by mass or less, more preferably 50% by mass or less. If the combined amount is more than 90% by mass, discoloration resistance may be reduced.

The combined amount of C33 to C44 normal alkanes based on 100% by mass of the petroleum-derived wax is preferably 25% by mass or more, more preferably 35% by mass or more. If the combined amount is less than 25% by mass, sufficient ozone resistance may not be obtained at a temperature range from about 40° C. to about 50° C. The combined amount is preferably 90% by mass or less, more preferably 50% by mass or less. If the combined amount is more than 90% by mass, a large amount of C33 to C44 normal alkanes tend to bloom at a temperature range from about 40° C. to about 50° C., causing white discoloration.

The combined amount of C45 to C47 normal alkanes based on 100% by mass of the petroleum-derived wax is preferably 0.5% by mass or more, more preferably 2% by mass or more. If the combined amount is less than 0.5% by mass, crack resistance may be slightly deteriorated at a temperature range of about 60° C. The combined amount is preferably 10% by mass or less, more preferably 5% by mass or less. If the combined amount is more than 10% by mass, resistance to discoloration (white discoloration) tends to be deteriorated at a temperature range of about 60° C.

The combined amount of C48 and higher normal alkanes based on 100% by mass of the petroleum-derived wax is preferably 10% by mass or less, more preferably 5% by mass or less. In such case, good resistance to discoloration (white discoloration) can be achieved at a temperature range of 60° C. or higher.

In the case of the rubber composition containing a petroleum-derived wax, the amount of petroleum-derived wax per 100 parts by mass of the rubber component is preferably 0.5 parts by mass or more, more preferably 0.8 parts by mass or more. If the amount is less than 0.5 parts by mass, sufficient ozone resistance and sufficient TGC resistance may not be obtained. The amount of petroleum-derived wax is also preferably 4.0 parts by mass or less, more preferably 3.0 parts by mass or less, still more preferably 2.0 parts by mass or less. If the amount is more than 4.0 parts by mass, too large an amount of blooms may be formed, which can easily cause discoloration (brown discoloration).

The rubber composition for cap treads preferably contains carbon black. The addition of carbon black produces a reinforcing effect and an UV-blocking effect and therefore the effects of the present invention can be well achieved. Examples of usable carbon black include GPF, FEF, HAF, ISAF, and SAF.

The carbon black preferably has a nitrogen adsorption specific surface area ($N_2SA$) of 20 to 200 $m^2/g$, more preferably 90 to 130 $m^2/g$. If the $N_2SA$ is less than 20 $m^2/g$, durability or handling stability may be reduced. If the $N_2SA$ is more than 200 m²/g, sufficient fuel economy or processability may not be obtained. Herein, the nitrogen adsorption specific surface area of carbon black can be determined in conformity with JIS K 6217-2:2001.

In the case of the rubber composition containing carbon black, the amount of carbon black per 100 parts by mass of the rubber component is preferably 2 to 120 parts by mass, more preferably 3 to 80 parts by mass, still more preferably 5 to 70 parts by mass. If the amount is less than 2 parts by mass, sufficient resistance to cracks caused by ultraviolet rays tends not to be obtained and ozone resistance tends to be deteriorated. If the amount is more than 120 parts by mass, fuel economy or chipping resistance (elongation at break) may be deteriorated.

The rubber composition for cap treads preferably contains silica. Any silica may be used, and examples include dry silica (anhydrous silica) and wet silica (hydrous silica). Wet silica (hydrous silica) is preferred because it has many silanol groups.

In the case of the rubber composition containing silica, the amount of silica per 100 parts by mass of the rubber component is preferably 5 to 130 parts by mass, more preferably 10 to 120 parts by mass. If the amount is more than 130 parts by mass, fuel economy or chipping resistance (elongation at break) may be deteriorated.

In the rubber composition for cap treads, the combined amount of carbon black and silica is preferably 35 to 140 parts by mass, more preferably 40 to 130 parts by mass, still more preferably 50 to 120 parts by mass, per 100 parts by mass of the rubber component. If the combined amount is less than 35 parts by mass, abrasion resistance tends to be reduced. If the combined amount is more than 140 parts by mass, fuel economy or chipping resistance (elongation at break) tends to be deteriorated.

In the case of the rubber composition containing silica, the rubber composition preferably contains a silane coupling agent together with silica.

Any silane coupling agent conventionally used in combination with silica in the rubber industry may be used. Examples include sulfide silane coupling agents such as bis(3-triethoxysilylpropyl)disulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Sulfide silane coupling agents are preferred among these.

The rubber composition for cap treads may contain a softener. When a softener is added, blooming of the above-mentioned antioxidant, nonionic surfactant, and petroleum-derived wax can be suitably controlled and the effects of the present invention can be better achieved.

Examples of the softener include oil, and resins such as C5 petroleum resin, C9 petroleum resin, coumarone indene resin, terpene phenol resin, indene resin, phenolic resins, or aromatic vinyl polymers obtained by polymerizing α-methylstyrene and/or styrene. The softener may be appropriately selected depending on the migration rate of the wax or antioxidant, and the like. Among these, oil, coumarone indene resin, aromatic vinyl polymers, and terpene phenol resin are preferred because the effects of the present invention can be suitably achieved.

Examples of the oil include process oils, vegetable fats and oils, and mixtures of these. Examples of the process oils include paraffinic process oils, aromatic process oils, and naphthenic process oils. Specific examples of the paraffinic process oil include PW-32, PW-90, PW-150, and PS-32 available from Idemitsu Kosan Co., Ltd. Specific examples of the aromatic process oil include AC-12, AC-460, AH-16, AH-24, and AH-58 available from Idemitsu Kosan Co., Ltd. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice bran oil, safflower oil, sesame oil, olive oil, sunflower oil, palm kernel oil, camellia oil, jojoba oil, macadamia nut oil, and tung oil. Each of these may be used alone, or two or more of these may be used in combination. Among these, aromatic process oils are preferred because the effects of the present invention can be suitably achieved.

Any known phenolic resin may be used. In particular, the phenolic resin may suitably be a non-reactive alkylphenol resin. The non-reactive alkylphenol resin refers to an alkylphenol resin having no reaction point at the ortho or para position, and especially the para position, relative to the hydroxy group on each benzene ring in the polymer chain. The non-reactive alkylphenol resin may suitably be represented by Formula (I) or (II) below because excellent processability, fuel economy, and breaking performance can be obtained.

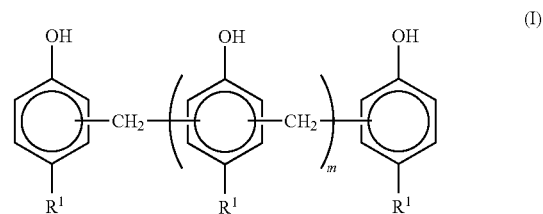

(I)

In Formula (I), m represents an integer. For a moderate degree of blooming, m is preferably 1 to 10, more preferably 2 to 9. $R^1$s are the same or different and each represent an alkyl group. In view of affinity with rubber, the carbon number of the alkyl group is preferably 4 to 15, more preferably 6 to 10.

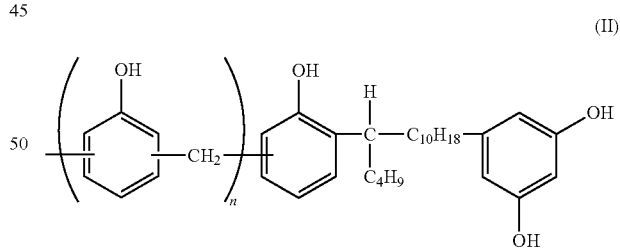

(II)

In Formula (II), n represents an integer. For a moderate degree of blooming, n is preferably 1 to 10, more preferably 2 to 9.

In the case of the rubber composition containing a softener, the amount of softener (preferably, the combined amount of resin and oil) per 100 parts by mass of the rubber component is preferably 1.0 part by mass or more, more preferably 2.0 parts by mass or more, still more preferably 3.0 parts by mass or more. Also, the amount of softener is preferably 50 parts by mass or less, more preferably 45 parts by mass or less, still more preferably 40 parts by mass or less. When the amount of softener, which itself blooms to the tire surface, is adjusted to the above range, blooming of the above-mentioned antioxidant, nonionic surfactant, and petroleum-derived wax can be suitably controlled and the effects of the present invention can be more suitably achieved.

The rubber composition for cap treads may appropriately contain compounding agents commonly used in the manufacture of rubber compositions, such as zinc oxide, a vulcanizing agent, or a vulcanization accelerator, in addition to the above-mentioned components.

Sulfur is preferably used as a vulcanizing agent in the present invention. In this case, a moderate amount of cross-links are formed between polymers, as a result of which blooming of the above-mentioned antioxidant, nonionic surfactant, and petroleum-derived wax can be suitably controlled and the effects of the present invention can be more suitably achieved. Examples of the sulfur include those commonly used in the rubber industry, such as powdered sulfur, precipitated sulfur, colloidal sulfur, insoluble sulfur, highly dispersible sulfur, and soluble sulfur. Each of these may be used alone, or two or more of these may be used in combination.

The amount of sulfur per 100 parts by mass of the rubber component is preferably 0.1 parts by mass or more, more preferably 0.5 parts by mass or more, still more preferably 1.0 part by mass or more. If the amount is less than 0.1 parts by mass, insufficient hardness (Hs) after vulcanization may be obtained and co-curing with neighboring rubber compounds may be insufficient. The amount of sulfur is preferably 6.0 parts by mass or less, more preferably 4.0 parts by mass or less, still more preferably 2.0 parts by mass or less, particularly preferably 1.8 parts by mass or less. If the amount is more than 6.0 parts by mass, crack growth resistance, ozone resistance, elongation at break, or durability may be deteriorated.

The amount of sulfur as used herein refers to the total net sulfur amount of the vulcanizing agents added to the rubber composition. In the case where the vulcanizing agent used is oil-containing sulfur, the net sulfur means the sulfur content in the oil-containing sulfur. In the case where the vulcanizing agent used is a sulfur atom-containing compound such as an alkylphenol-sulfur chloride condensate, it means the sulfur atoms contained in the compound.

The rubber composition for cap treads may be prepared by known methods, such as, for example, by kneading the above components using a rubber kneading machine such as an open roll mill or a Banbury mixer, and then vulcanizing the mixture.

(Base Tread)

As described above, the base tread is a component formed from a rubber composition for base treads.

Examples of the rubber component usable in the rubber composition for base treads include those mentioned for the rubber component usable in the rubber composition for cap treads. Each of these may be used alone, or two or more of these may be used in combination. Among these, diene rubbers are preferred because they can be suitably used for base treads. Further, among diene rubbers, isoprene-based rubbers, BR and SBR are preferred, and combinations of BR with isoprene-based rubbers are more preferred, because they provide good handling stability, good fuel economy, good elongation at break, good durability, and good crack growth resistance.

The amount of diene rubber based on 100% by mass of the rubber component is preferably 70% by mass or more, more preferably 80% by mass or more, still more preferably 90% by mass or more, and may be 100% by mass. The rubber composition containing the above amount of diene rubber can suitably enjoy the effects of the present invention and can also be suitably used as a rubber composition for base treads.

The isoprene-based rubber or SBR may suitably be a similar embodiment as mentioned for the rubber composition for cap treads.

The BR is not particularly limited, and may be any of those commonly used in the tire industry, including, for example, high-cis BR such as BR1220 available from Zeon Corporation, and BR130B and BR150B available from Ube Industries, Ltd.; BR containing 1,2-syndiotactic polybutadiene crystals (SPB) such as VCR412 and VCR617 available from Ube Industries, Ltd.; and polybutadiene rubber synthesized using a rare earth catalyst (rare earth-catalyzed BR). The BR may also be tin-modified polybutadiene rubber (tin-modified BR) which has been modified with a tin compound. In particular, the BR preferably has a cis content of 95% by mass or more. A combination of SPB-containing BR and tin-modified BR is also preferred.

In a preferred embodiment of SPB-containing BR, in view of abrasion resistance and extrusion processability, SPB crystals are not merely dispersed in BR but are chemically bonded to BR and dispersed therein. The SPB preferably has a melting point of 180° C. to 220° C. The SPB content in the SPB-containing BR is preferably 2.5 to 20% by mass. The SPB content in the SPB-containing BR refers to the amount of boiling n-hexane insolubles.

Preferably, the tin-modified BR is prepared by polymerization of 1,3-butadiene using a lithium initiator, followed by the addition of a tin compound, and has a tin-carbon bond at a molecular chain end thereof.

Examples of the lithium initiator include lithium compounds such as alkyllithiums and aryllithiums. Examples of the tin compound include tin tetrachloride and butyltin trichloride. The tin-modified BR preferably has a tin atom content of 50 to 3000 ppm. The tin-modified BR preferably has a molecular weight distribution (Mw/Mn) of 2 or less. The number average molecular weight (Mn) and the weight average molecular weight (Mw) are determined using a gel permeation chromatograph (GPC) and calibrated with polystyrene standards. Moreover, the tin-modified BR preferably has a vinyl content of 5 to 50% by mass. The vinyl content (the proportion of 1,2-butadiene units) can be measured with infrared absorption spectrometry.

The amount of BR may be 0% by mass. In the case of the rubber composition containing BR, the amount of BR based on 100% by mass of the rubber component is preferably 10% by mass or more, more preferably 20% by mass or more. The amount is preferably 60% by mass or less, more preferably 40% by mass or less. When the amount of BR is within the above range, good handling stability, good fuel economy, good elongation at break, good durability, and good crack growth resistance can be obtained.

The combined amount of isoprene-based rubber and BR may be 0% by mass. The combined amount of isoprene-based rubber and BR based on 100% by mass of the rubber component is preferably 70% by mass or more, more preferably 80% by mass or more, and may be 100% by mass. In such case, good handling stability, good fuel economy, good elongation at break, good durability, and good crack growth resistance can be obtained.

In the rubber composition for base treads, the amount of phenylenediamine antioxidant based on 100% by mass of the rubber composition for base treads is preferably 3.5% by mass or less, more preferably 3.0% by mass or less, still more preferably 2.5% by mass or less. If the amount is more than 3.5% by mass, heat build-up and brown discoloration problems arise. The amount is preferably 1.0% by mass or more, more preferably 1.2% by mass or more, still more preferably 1.4% by mass or more. If the amount is less than 1.0% by mass, sufficient TGC resistance may not be obtained.

In the present invention, the rubber composition for base treads preferably contains a nonionic surfactant. The nonionic surfactant may suitably be a similar embodiment as mentioned for the rubber composition for cap treads.

In the case of the rubber composition containing the nonionic surfactant, the amount of the nonionic surfactant (preferably, the combined amount of the nonionic surfactant represented by Formula (1), the nonionic surfactant represented by Formula (2), and the Pluronic-type nonionic surfactant) per 100 parts by mass of the rubber component is preferably 0.01 parts by mass or more, more preferably 0.1 parts by mass or more, still more preferably 0.3 parts by mass or more. If the amount is less than 0.01 parts by mass, sufficient TGC resistance or discoloration resistance may not be obtained. The combined amount is also preferably 5.0 parts by mass or less, more preferably 4.0 parts by mass or less, still more preferably 3.0 parts by mass or less, particularly preferably 2.5 parts by mass or less. If the amount is more than 5.0 parts by mass, the bloom layer containing the surfactant, wax and antioxidant may be eluted during running in the rain, resulting in deteriorated TGC resistance.

In the present invention, the rubber composition for base treads preferably contains a petroleum-derived wax. This provides good TGC resistance. The petroleum-derived wax may suitably be a similar embodiment as mentioned for the rubber composition for cap treads.

In the case of the rubber composition containing a petroleum-derived wax, the amount of petroleum-derived wax per 100 parts by mass of the rubber component is preferably 0.5 parts by mass or more, more preferably 0.8 parts by mass or more. If the amount is less than 0.5 parts by mass, sufficient ozone resistance and sufficient TGC resistance may not be obtained. The amount is also preferably 4.0 parts by mass or less, more preferably 3.0 parts by mass or less, still more preferably 2.0 parts by mass or less. If the amount is more than 4.0 parts by mass, building tack may be reduced, and too large an amount of blooms may be formed, which can easily cause discoloration (brown discoloration).

The rubber composition for base treads preferably contains a naturally occurring wax containing 40 to 98% by mass of an ester component. The amount (content) of the ester component based on 100% by mass of the naturally occurring wax is preferably 50 to 98% by mass, more preferably 60 to 98% by mass. A wax containing more than 98% by mass of the ester component tends to have reduced flexibility and thus to form a more fragile thin film.

The amount of free alcohol or free fatty acid based on 100% by mass of the naturally occurring wax is independently preferably 10% by mass or less, more preferably 7% by mass or less. If the amount is more than 10% by mass, ozone resistance, especially at low temperatures, tends to be deteriorated.

Regarding the carbon number distribution (molecular weight distribution), i.e., the softening point distribution, of the naturally occurring wax, the naturally occurring wax preferably contains a component having a softening point of 40° C. to 95° C., more preferably 60° C. to 90° C., still more preferably 70° C. to 86° C. In such case, both discoloration resistance and ozone resistance can be ensured.

The softening point distribution of the wax can be determined, for example, by gas chromatography (GC) or by measuring heat flow (mW/g) at a rate of temperature rise of 5° C./min from −30° C. to 100° C. using a differential scanning calorimeter (DSC). When DSC is used, the presence of a component having a predetermined softening point in the wax can be determined based on whether or not the curve of heat flow versus temperature at the predetermined temperature point is below the baseline toward the endothermic side.

The naturally occurring wax (natural wax) may be a wax obtained by removing free fatty acids, free alcohols, resins, or the like from a naturally occurring wax. Suitable examples include refined naturally occurring waxes (refined natural waxes) such as refined gramineous plant waxes extracted from gramineous plants, e.g., refined rice wax, refined candelilla wax, refined beeswax, refined sugar cane wax, and the like. The use of such a refined naturally occurring wax, which contains reduced amounts of polar components, such as free fatty acids, free alcohols or resins, and has an increased relative proportion of hydrocarbons, not only improves the compatibility with low polarity rubber and the uniformity of the resulting film but also suppresses blooming. Therefore, brown discoloration of the rubber surface can be prevented.

The refined naturally occurring wax may be, for example, a wax obtained by removing at least one selected from the group consisting of free fatty acids, free alcohols, and resins from a naturally occurring wax. The naturally occurring wax may be any wax other than petroleum-derived waxes. Examples include plant waxes such as waxes extracted from gramineous plants, e.g., rice wax, candelilla wax, carnauba wax, Japan wax, and jojoba wax; animal waxes such as beeswax, lanolin, and spermaceti; mineral waxes such as ozokerite, ceresin, and petrolatum; hydrogenated natural fats and oils such as hydrogenated castor oil, hydrogenated soybean oil, hydrogenated rapeseed oil, and hydrogenated beef tallow; and refined products of the foregoing. Moreover, the naturally occurring wax may be derived from a genetically modified plant or animal. The removal may be carried out by any method that can remove free alcohols, free fatty acids, or resins, and known methods may be used.

The naturally occurring wax is preferably a refined plant wax, preferably a refined wax extracted from a gramineous plant, particularly preferably refined rice wax. Moreover, the use of refined rice wax in combination with a petroleum-derived wax can suppress formation of cracks and provide excellent ozone resistance over a wide temperature range from low to high temperatures, and at the same time can sufficiently prevent brown discoloration and white discoloration. Furthermore, although the film may be broken by dynamic stimuli imposed during service of the tire, refined rice wax, which is a fatty acid ester and can be readily mixed with petroleum-derived waxes, antioxidants, and surfactants, can be expected to prevent crack formation and discoloration for a long period of time. The naturally occurring wax may be used alone or in combinations of two or more.

In the case of the rubber composition containing a naturally occurring wax, the amount of the naturally occurring wax per 100 parts by mass of the rubber component is preferably 0.1 parts by mass or more, more preferably 0.5 parts by mass or more, still more preferably 1.0 part by mass or more. If the amount is less than 0.1 parts by mass, improved long-term ozone resistance may not be found. Also, the amount is preferably 5.0 parts by mass or less, more preferably 3.5 parts by mass or less. If the amount is more than 5.0 parts by mass, the initial amount of blooms of antioxidants may decrease so that initial ozone resistance can be reduced.

The rubber composition for base treads preferably contains carbon black. The addition of carbon black produces a reinforcing effect and an UV-blocking effect and therefore the effects of the present invention can be well achieved. Examples of usable carbon black include GPF, FEF, HAF, ISAF, and SAF.

The carbon black preferably has a nitrogen adsorption specific surface area ($N_2SA$) of 20 to 200 $m^2/g$, more preferably 50 to 90 $m^2/g$. If the $N_2SA$ is less than 20 $m^2/g$, durability or handling stability may be reduced. If the $N_2SA$ is more than 200 $m^2/g$, sufficient fuel economy or processability may not be obtained.

In the case of the rubber composition containing carbon black, the amount of carbon black per 100 parts by mass of the rubber component is preferably 2 to 120 parts by mass, more preferably 10 to 80 parts by mass, still more preferably 15 to 50 parts by mass. If the amount is less than 2 parts by mass, sufficient reinforcing properties tend not to be obtained and handling stability, ozone resistance, or crack growth resistance tends to be deteriorated. If the amount is more than 120 parts by mass, fuel economy or elongation at break may be deteriorated.

The rubber composition for base treads preferably contains silica. The silica may suitably be a similar embodiment as mentioned for the rubber composition for cap treads.

In the case of the rubber composition containing silica, the amount of silica per 100 parts by mass of the rubber component is preferably 5 to 60 parts by mass, more preferably 10 to 40 parts by mass. If the amount is more than 60 parts by mass, fuel economy may be deteriorated. In addition, a shrinkage problem accompanying cooling after extrusion may easily occur.

In the rubber composition for base treads, the combined amount of carbon black and silica per 100 parts by mass of the rubber component is preferably 20 to 150 parts by mass, more preferably 30 to 120 parts by mass, still more preferably 40 to 90 parts by mass. If the combined amount is less than 20 parts by mass, handling stability, crack growth resistance, or discoloration resistance tends to be reduced. If the combined amount is more than 150 parts by mass, fuel economy or elongation at break tends to be deteriorated.

In the case of the rubber composition containing silica, the rubber composition preferably contains a silane coupling agent together with silica. The silane coupling agent may suitably be a similar embodiment as mentioned for the rubber composition for cap treads.

The rubber composition for base treads may contain a softener. When a softener is added, blooming of the above-mentioned antioxidant, nonionic surfactant, and petroleum-derived wax can be suitably controlled and the effects of the present invention can be better achieved. The softener may suitably be as mentioned for the rubber composition for cap treads. In particular, phenolic resins are preferred because the effects of the present invention can be suitably achieved.

In the case of the rubber composition containing a softener, the amount of softener per 100 parts by mass of the rubber component is preferably 1.0 part by mass or more, more preferably 3.0 parts by mass or more. Also, the amount of softener is preferably 15 parts by mass or less, more preferably 10 parts by mass or less, still more preferably 8 parts by mass or less. When the amount of softener, which itself blooms to the tire surface, is adjusted to the above range, blooming of the above-mentioned antioxidant, nonionic surfactant, and petroleum-derived wax can be suitably controlled and, further, the migration of oil from the base tread to the breaker can be suppressed, with the result that the effects of the present invention can be more suitably achieved.

In the case of the rubber composition containing a phenolic resin, the amount of phenolic resin per 100 parts by mass of the rubber component is preferably 0.1 to 5.0 parts by mass, more preferably 0.5 to 4.0 parts by mass, still more preferably 1.0 to 3.0 parts by mass. In such case, building tack can be enhanced and the effects of the present invention can be more suitably achieved.

The rubber composition for base treads may appropriately contain compounding agents commonly used in the manufacture of rubber compositions, such as zinc oxide, a vulcanizing agent, or a vulcanization accelerator, in addition to the above components.

Sulfur is preferably used as a vulcanizing agent in the present invention. In this case, a moderate amount of cross-links are formed between polymers, as a result of which blooming of the above-mentioned antioxidant, nonionic surfactant, and petroleum-derived wax can be suitably controlled and the effects of the present invention can be more suitably achieved. The sulfur may suitably be a similar embodiment as mentioned for the rubber composition for cap treads.

The amount of sulfur per 100 parts by mass of the rubber component is preferably 0.1 parts by mass or more, more preferably 0.5 parts by mass or more, still more preferably 1.0 part by mass or more. If the amount is less than 0.1 parts by mass, insufficient hardness (Hs) after vulcanization may be obtained and co-curing with neighboring rubber compounds may be insufficient. The amount of sulfur is preferably 6.0 parts by mass or less, more preferably 5.0 parts by mass or less, still more preferably 4.0 parts by mass or less, particularly preferably 3.0 parts by mass or less. If the amount is more than 6.0 parts by mass, crack growth resistance, elongation at break, ozone resistance, or durability may be deteriorated.

The rubber composition for base treads preferably contains substantially no cobalt metal. Specifically, in the rubber composition for base treads, the amount of cobalt metal per 100 parts by mass of the rubber component is preferably 0.05 parts by mass or less, more preferably 0.01 parts by mass or less. In such case, crack growth resistance and elongation at break after thermal oxidative aging can be suitably ensured and better TGC resistance can be obtained.

The rubber composition for base treads may be prepared by known methods, such as, for example, by kneading the above components using a rubber kneading machine such as an open roll mill or a Banbury mixer and then vulcanizing the mixture.

(Undertread)

As described above, the undertread is a component formed from a rubber composition for undertreads.

Examples of the rubber component usable in the rubber composition for undertreads include those mentioned for the rubber component usable in the rubber composition for base treads. Each of these may be used alone, or two or more of these may be used in combination. Among these, diene rubbers are preferred because they can be suitably used for undertreads. Further, among diene rubbers, isoprene-based rubbers are preferred because they provide good handling stability, good fuel economy, good elongation at break, good durability, and good crack growth resistance. The rubber composition for undertreads may be a rubber composition similar to the rubber composition for base treads, or a rubber composition prepared by treating the rubber composition for base treads so as to have improved tackiness.

The amount of diene rubber based on 100% by mass of the rubber component is preferably 70% by mass or more, more preferably 80% by mass or more, still more preferably 90% by mass or more, and may be 100% by mass. The rubber composition containing the above amount of diene rubber can suitably enjoy the effects of the present invention and can also be suitably used as a rubber composition for undertreads.

The isoprene-based rubber may suitably be a similar embodiment as mentioned for the rubber composition for cap treads.

The amount of isoprene-based rubber may be 0% by mass. In the case of the rubber composition containing an isoprene-based rubber, the amount of isoprene-based rubber based on 100% by mass of the rubber component is preferably 30% by mass or more, more preferably 60% by mass or more, still more preferably 80% by mass or more, and may be 100% by mass. If the amount is less than 30% by mass, sufficient mechanical strength may not be obtained.

In the rubber composition for undertreads, the amount of phenylenediamine antioxidant based on 100% by mass of the rubber composition for undertreads is preferably 6.0% by mass or less, more preferably 5.0% by mass or less, still more preferably 4.0% by mass or less, particularly preferably 3.0% by mass or less. If the amount is more than 6.0% by mass, discoloration and heat build-up problems arise. The amount is preferably 1.0% by mass or more, more preferably 1.5% by mass or more, still more preferably 2.1% by mass or more. If the amount is less than 1.0% by mass, sufficient TGC resistance may not be obtained.

In the present invention, the rubber composition for undertreads may contain a petroleum-derived wax. The petroleum-derived wax may suitably be a similar embodiment as mentioned for the rubber composition for cap treads.

In the case of the rubber composition containing a petroleum-derived wax, the amount of petroleum-derived wax per 100 parts by mass of the rubber component is preferably 4.0 parts by mass or less, more preferably 2.0 parts by mass or less. Still more preferably, the rubber composition contains substantially no petroleum-derived wax; specifically, the amount is still more preferably 0.05 parts by mass or less, particularly preferably 0.01 parts by mass or less. If the amount is more than 4.0 parts by mass, too large an amount of blooms may be formed, which may reduce building tack and can easily cause discoloration (brown discoloration).

The rubber composition for undertreads preferably contains a naturally occurring wax containing 40 to 98% by mass of an ester component. The naturally occurring wax may suitably be a similar embodiment as mentioned for the rubber composition for base treads.

The rubber composition for undertreads preferably contains carbon black. The addition of carbon black produces a reinforcing effect and an UV-blocking effect and therefore the effects of the present invention can be well achieved. The usable carbon black may suitably be a similar embodiment as mentioned for the rubber composition for base treads.

The rubber composition for undertreads preferably contains silica. The silica may suitably be a similar embodiment as mentioned for the rubber composition for cap treads.

In the case of the rubber composition containing silica, the rubber composition preferably contains a silane coupling agent together with silica. The silane coupling agent may suitably be a similar embodiment as mentioned for the rubber composition for cap treads.

The rubber composition for undertreads may contain a softener. When a softener is added, blooming of the above-mentioned antioxidant, nonionic surfactant, and petroleum-derived wax can be suitably controlled and the effects of the present invention can be better achieved. The softener may suitably be a similar embodiment as mentioned for the rubber composition for cap treads. In particular, phenolic resins are preferred because the effects of the present invention can be suitably achieved. The phenolic resin may suitably be a similar embodiment as mentioned for the rubber composition for base treads.

The rubber composition for undertreads may appropriately contain compounding agents commonly used in the manufacture of rubber compositions, such as zinc oxide, a vulcanizing agent, or a vulcanization accelerator, in addition to the above components.

Sulfur is preferably used as a vulcanizing agent in the present invention. In this case, a moderate amount of cross-links are formed between polymers, as a result of which blooming of the above-mentioned antioxidant, nonionic surfactant, and petroleum-derived wax can be suitably controlled and the effects of the present invention can be more suitably achieved. The sulfur may suitably be a similar embodiment as mentioned for the rubber composition for base treads.

The rubber composition for undertreads preferably contains substantially no cobalt metal. Specifically, in the rubber composition for undertreads, the amount of cobalt metal per 100 parts by mass of the rubber component is preferably 0.05 parts by mass or less, more preferably 0.01 parts by mass or less. In such case, crack growth resistance and elongation at break after thermal oxidative aging can be suitably ensured and better TGC resistance can be obtained.

The rubber composition for undertreads may be prepared by known methods, such as, for example, by kneading the above components using a rubber kneading machine such as an open roll mill or a Banbury mixer and then vulcanizing the mixture.

(Jointless Band)

As described above, the jointless band is a component including fiber cords coated with a rubber composition for fiber cord toppings.

Examples of the rubber component usable in the rubber composition for fiber cord toppings include those mentioned for the rubber component usable in the rubber composition for cap treads. Each of these may be used alone, or two or more of these may be used in combination. Among these, diene rubbers are preferred because they provide excellent adhesion to cords and can be suitably used for jointless bands. Further, among diene rubbers, isoprene-based rubbers, SBR and BR are preferred, and combinations of SBR with isoprene-based rubbers are more preferred, because they provide good handling stability, good fuel economy, good elongation at break, good durability, and good crack growth resistance.

The amount of diene rubber based on 100% by mass of the rubber component is preferably 70% by mass or more, more preferably 80% by mass or more, still more preferably 90% by mass or more, and may be 100% by mass. The rubber composition containing the above amount of diene rubber can suitably enjoy the effects of the present invention and can also be suitably used as a rubber composition for fiber cord toppings.

The isoprene rubber or SBR may suitably be a similar embodiment as mentioned for the rubber composition for cap treads.

The amount of isoprene-based rubber may be 0% by mass. In the case of the rubber composition containing an isoprene-based rubber, the amount of isoprene-based rubber based on 100% by mass of the rubber component is preferably 30% by mass or more, more preferably 60% by mass or more. If the amount is less than 30% by mass, sufficient elongation at break or handling stability may not be obtained. The amount is preferably 90% by mass or less, more preferably 80% by mass or less. If the amount is more than 90% by mass, cure reversion resistance may be reduced.

The amount of SBR may be 0% by mass. In the case of the rubber composition containing SBR, the amount of SBR based on 100% by mass of the rubber component is preferably 10% by mass or more, more preferably 20% by mass or more. If the amount is less than 10% by mass, cure reversion resistance may be reduced. The amount is preferably 70% by mass or less, more preferably 40% by mass or less. If the amount is more than 70% by mass, sufficient mechanical strength may not be obtained.

The combined amount of isoprene-based rubber and SBR may be 0% by mass. The combined amount of isoprene-based rubber and SBR based on 100% by mass of the rubber component is preferably 70% by mass or more, more preferably 80% by mass or more, and may be 100% by mass. In such case, good handling stability, good fuel economy, good elongation at break, good durability, and good crack growth resistance can be obtained.

In the rubber composition for fiber cord toppings, the amount of phenylenediamine antioxidant based on 100% by mass of the rubber composition for fiber cord toppings is preferably 1% by mass or less, more preferably 0.5% by mass or less. Still more preferably, the rubber composition contains substantially no phenylenediamine antioxidant; specifically, the amount is particularly preferably 0.05% by mass or less, most preferably 0.01% by mass or less. In such case, the effects of the present invention can be more suitably achieved.

In the present invention, the rubber composition for fiber cord toppings may contain a petroleum-derived wax. The petroleum-derived wax may suitably be a similar embodiment as mentioned for the rubber composition for cap treads.

In the case of the rubber composition containing a petroleum-derived wax, the amount of petroleum-derived wax per 100 parts by mass of the rubber component is preferably 4.0 parts by mass or less, more preferably 2.0 parts by mass or less. Still more preferably, the rubber composition contains substantially no petroleum-derived wax; specifically, the amount is particularly preferably 0.05 parts by mass or less, most preferably 0.01 parts by mass or less. If the amount is more than 4.0 parts by mass, too large an amount of blooms may be formed, which can easily cause discoloration (brown discoloration).

The rubber composition for fiber cord toppings preferably contains carbon black. The addition of carbon black produces a reinforcing effect and a crack growth resistance-improving effect and therefore the effects of the present invention can be well achieved. The usable carbon black may suitably be a similar embodiment as mentioned for the rubber composition for base treads.

In the case of the rubber composition containing carbon black, the amount of carbon black per 100 parts by mass of the rubber component is preferably 20 to 80 parts by mass, more preferably 25 to 70 parts by mass, still more preferably 30 to 60 parts by mass. If the amount is less than 20 parts by mass, sufficient reinforcing properties tend not to be obtained and durability, elongation at break, handling stability, ozone resistance, or discoloration resistance tends to be deteriorated. If the amount is more than 80 parts by mass, fuel economy or ozone resistance may be deteriorated.

The rubber composition for fiber cord toppings preferably contains silica. The silica may suitably be a similar embodiment as mentioned for the rubber composition for cap treads.

In the case of the rubber composition containing silica, the amount of silica per 100 parts by mass of the rubber component is preferably 5 to 60 parts by mass, more preferably 5 to 20 parts by mass. If the amount is more than 60 parts by mass, fuel economy, elongation at break, or shrink resistance may be deteriorated.

In the rubber composition for fiber cord toppings, the combined amount of carbon black and silica per 100 parts by mass of the rubber component is preferably 30 to 80 parts by mass, more preferably 35 to 70 parts by mass, still more preferably 40 to 60 parts by mass. If the combined amount is less than 30 parts by mass, elongation at break, ozone resistance, crack growth resistance, or adhesion to cords tends to be reduced. If the amount is more than 80 parts by mass, fuel economy, crack growth resistance, or elongation at break tends to be deteriorated.

In the case of the rubber composition containing 15 parts by mass or more of silica, the rubber composition preferably contains a silane coupling agent together with silica. The silane coupling agent may suitably be a similar embodiment as mentioned for the rubber composition for cap treads.

The rubber composition for fiber cord toppings may contain a softener. The softener may suitably be as mentioned for the rubber composition for cap treads.

In the case of the rubber composition containing a softener, the amount of softener is preferably 5 parts by mass or less, more preferably 3 parts by mass or less. Still more preferably, the rubber composition contains substantially no softener; specifically, the amount is particularly preferably 0.05 parts by mass or less, most preferably 0.01 parts by mass or less. In such case, the effects of the present invention can be more suitably achieved.

The rubber composition for fiber cord toppings may appropriately contain compounding agents commonly used in the manufacture of rubber compositions, such as zinc oxide, a vulcanizing agent, or a vulcanization accelerator, in addition to the above components.

Sulfur is preferably used as a vulcanizing agent in the present invention. In this case, a moderate amount of crosslinks are formed between polymers, as a result of which blooming of the above-mentioned antioxidant, nonionic surfactant, and petroleum-derived wax can be suitably controlled and the effects of the present invention can be more suitably achieved. The sulfur may suitably be a similar embodiment as mentioned for the rubber composition for cap treads.

The amount of sulfur per 100 parts by mass of the rubber component is preferably 1.0 part by mass or more, more preferably 1.5 parts by mass or more, still more preferably 2.0 parts by mass or more. If the amount is less than 1.0 part by mass, insufficient hardness (Hs) after vulcanization may be obtained and co-curing with neighboring rubber compounds may be insufficient. The amount of sulfur is preferably 6.0 parts by mass or less, more preferably 5.0 parts by mass or less, still more preferably 4.0 parts by mass or less. If the amount is more than 6.0 parts by mass, elongation at break, crack growth resistance, or durability may be deteriorated.

The rubber composition for fiber cord toppings may be prepared by known methods, such as, for example, by kneading the above components using a rubber kneading machine such as an open roll mill or a Banbury mixer and then vulcanizing the mixture.

The pneumatic tire of the present invention can be manufactured using the rubber compositions by conventional methods. Specifically, the rubber compositions optionally containing various additives, before vulcanization, are extruded into the shape of a tire component (cap tread, base tread, undertread, jointless band) (in the case of a jointless band, the upper and lower surfaces of fiber cords are coated under pressure with a sheet of the unvulcanized rubber composition for fiber cord toppings to give a jointless band shape). The thus prepared components are assembled with other tire components in a conventional manner on a tire building machine to build an unvulcanized tire, which is then heated and pressurized in a vulcanizer to form a tire.

Examples of the fiber cords include cords formed from fibers such as polyethylene, nylon, aramid, glass fiber, polyester, rayon, or polyethylene terephthalate. Hybrid cords formed from multiple types of fibers may also be used.

EXAMPLES

The present invention is specifically described with reference to, but not limited to, examples.

The chemicals used in examples and comparative examples are collectively listed below.

NR: TSR20

SBR: SBR1502 available from Zeon Corporation

BR1: BR1250H (tin-modified BR polymerized using a lithium initiator, vinyl content: 10 to 13% by mass, Mw/Mn: 1.5, tin atom content: 250 ppm) available from Zeon Corporation BR2: VCR617 (SPB-containing BR, SPB content: 17% by mass, melting point of SPB: 200° C.) available from Ube Industries, Ltd.

Carbon black 1 (N351H): Shoblack N351H ($N_2SA$: 69 $m^2/g$, DBP oil absorption: 128 ml/100 g) available from Cabot Japan K.K.

Carbon black 2 (N220): Shoblack N220 ($N_2SA$: 111 $m^2/g$, DBP oil absorption: 115 ml/100 g) available from Cabot Japan K.K.

Silica: ULTRASIL VN3 available from Evonik Degussa

Silane coupling agent: Si75 (bis(3-triethoxysilyl-propyl) disulfide) available from Evonik Degussa Antioxidant 1: Antigene 6C (N-(1,3-dimethylbutyl)-N'-phenyl-p-phenylenediamine (6PPD)) available from Sumitomo Chemical Co., Ltd.

Antioxidant 2: NOCRAC 224 (2,2,4-trimethyl-1,2-dihydroquinoline polymer) available from Ouchi Shinko Chemical Industrial Co., Ltd.

Petroleum-derived wax: Trial product (normal alkane content: 85% by mass on average)

Surfactant: Newpol PE-64 (Pluronic-type nonionic surfactant, copolymer of PEG/PPG (25/30), Formula (I) in which a+c is 25 and b is 30) available from Sanyo Chemical Industries, Ltd.

Naturally occurring wax: Refined rice wax S-100 (softening point distribution: 77° C. to 83° C., ester component: 95% by mass, free fatty acid: 4% by mass, free alcohol: 1% by mass, hydrocarbon: 1% by mass) available from Yokozeki Oil & Fat Industries Co., Ltd.

Zinc oxide: Ginrei R available from Toho Zinc Co., Ltd.

SUMIKANOL 620: SUMIKANOL 620 (modified resorcinol resin (modified resorcinol-formaldehyde condensate)) available from Taoka Chemical Co., Ltd.

Oil: vivatec 500 (TDAE, low polycyclic aroma oil) available from H&R

Phenolic resin: SP1068 (non-reactive alkylphenol resin represented by Formula (I) wherein m is an integer of 1 to 10 and $R^1$ is an octyl group) available from Schenectady International Stearic acid: stearic acid "TSUBAKI" available from NOF Corporation SUMIKANOL 507A: SUMIKANOL 507A (modified etherified methylol melamine resin (partial condensate of hexamethylol melamine pentamethyl ether (HMMPME)), containing 35% by mass of oil and silica) available from Sumitomo Chemical Co., Ltd.

10% oil-containing insoluble sulfur: Seimi sulfur (insoluble sulfur containing 60% or more of carbon disulfide insolubles, oil content: 10% by mass) available from Nippon Kanryu Industry Co., Ltd.

20% oil-containing insoluble sulfur: CRYSTEX HSOT20 (insoluble sulfur containing 80% by mass of sulfur and 20% by mass of oil) available from Flexsys Vulcanization accelerator 1: NOCCELER NS (N-tert-butyl-2-benzothiazolylsulfenamide (TBBS)) available from Ouchi Shinko Chemical Industrial Co., Ltd.

Vulcanization accelerator 2: NOCCELER D (diphenyl-guanidine diphenylguanidine (DPG)) available from Ouchi Shinko Chemical Industrial Co., Ltd.

IR: IR2200

Cobalt stearate: cost-F (cobalt content: 9.5% by mass, stearic acid content: 90.5% by mass) available from Dainippon Ink and Chemicals The carbon number distribution of the petroleum-derived wax was determined by the method described below. Table 4 shows the results.

The carbon number distribution was measured using a capillary GC analyzer and a capillary column coated with aluminum with helium carrier gas at a flow rate of 4 mL/min, a column temperature of 180° C. to 390° C., and a rate of temperature rise of 15° C./min.

Examples and Comparative Examples

The chemicals in formulation amounts shown in Table 1 to 3, except the sulfur and vulcanization accelerators, were kneaded in a 1.7-L Banbury mixer available from Kobe Steel, Ltd. Then, the sulfur and vulcanization accelerator(s) were added to the kneaded mixture and they were kneaded using an open roll mill to prepare an unvulcanized rubber composition. The unvulcanized rubber composition was formed into the shape of a cap tread, a base tread, an undertread, or a jointless band (in the case of a jointless band, the upper and lower surfaces of fiber cords are coated under pressure with a sheet of the unvulcanized rubber composition for fiber cord toppings to give a jointless band shape). The components thus prepared were assembled with other tire components to build an unvulcanized tire, which was then vulcanized at 170° C. to prepare a test tire (205/65R15, 8.7 kg). The specification of the test tire was as follows: the tread pattern included five main grooves; the sub-tread structure was as shown in Table 2 or 3; and the fiber cords used were nylon 6,6 cords (1400 d-tex/2, cord diameter: 0.54 mm) available from Asahi Kasei Corporation. The test tires thus prepared were evaluated for performance by the following tests.

In Examples 2, 4, 6, 7, 9, 11 to 16, and 23 and Comparative Example 8 and 9, no base tread was provided but an undertread was provided. In accordance with the definition in the description of the present application, the undertread corresponds to a base tread.

<TGC Resistance Test>

Twelve test tires were stacked flat (horizontally) on each other in a warehouse in Osaka and stored for three months. Since cracking due to ozone can readily occur at the base of the main grooves of the bottom tire depending on the total weight of the tires stacked thereon (practically, a load of 11×8.7 kg tires was applied from the tires thereon), the degree of TGC in the main grooves of the lowermost tire, which was most deformed, was observed after three-month storage and expressed as an index, with the result of Comparative Example 10 equal to 100. A higher index indicates higher TGC resistance, which means better suppression of TGC. The target index was 100 or higher.

<Discoloration Test>

Outdoors: Evaluation of Brown Discoloration

The tires were left outside for 6 months (from winter to summer) at Kobe city while they were protected from rain under a semi-transparent roof. Then, a* and b* of the tread portion were measured using a colorimeter, and the sum of the a* and b* values was expressed as an index, with the result of Comparative Example 4 equal to 100. A higher index indicates a lower degree of brown discoloration. The target index was 90 or higher. The measurement was performed on a rubber of the tread portion at about 1 mm inside the rib surface contacting the road surface, not at the base of the grooves.

TABLE 1

|  |  | Cap formulation | | | | | Base formulation | |
| --- | --- | --- | --- | --- | --- | --- | --- | --- |
|  |  | A | B | C | D | E | A | B |
| Formulation (parts by mass) | NR | 70 | 70 | 70 | 70 | 70 | 70 | 30 |
|  | SBR | 30 | 30 | 30 | 30 | 30 | — | 70 |
|  | BR1 (BR1250H) | — | — | — | — | — | 30 | — |
|  | BR2 (VCR617) | — | — | — | — | — | — | — |
|  | Carbon black 1 (N351) | — | — | — | — | — | 40 | 75 |
|  | Carbon black 2 (N220) | 50 | 50 | 50 | 50 | 50 | — | — |
|  | Silica | 27 | 27 | 27 | 27 | 27 | — | — |
|  | Silane coupling agent | 1.6 | 1.6 | 1.6 | 1.6 | 1.6 | — | — |
|  | Antioxidant 1 (6PPD) | 2.0 | 2.4 | 2.6 | 3.3 | 4.0 | 2.4 | 3.5 |
|  | Antioxidant 2 | 1 | 1 | 1 | 1 | 1 | 1 | 2 |
|  | Petroleum-derived wax | 1 | 1 | 1 | 1 | 1 | 1.5 | 1.5 |
|  | Surfactant | — | — | — | 1.0 | — | — | — |
|  | Naturally occurring wax | — | — | — | — | — | — | — |
|  | Zinc oxide | 2.5 | 2.5 | 2.5 | 2.5 | 2.5 | 3 | 3 |
|  | SUMIKANOL 620 | — | — | — | — | — | — | — |
|  | Oil | 14 | 14 | 14 | 14 | 14 | 8 | 15 |
|  | Phenolic resin | — | — | — | — | — | 2 | 2 |
|  | Stearic acid | 2 | 2 | 2 | 2 | 2 | 2 | 2 |
|  | SUMIKANOL 507A | — | — | — | — | — | — | — |
|  | 10% oil-containing insoluble sulfur | 1.5 | 1.5 | 1.5 | 1.5 | 1.5 | 2.222 | 2.45 |
|  | Vulcanization accelerator 1 (TBBS) | 1.2 | 1.2 | 1.2 | 1.2 | 1.2 | 0.75 | 1.2 |
|  | Vulcanization accelerator 2 (DPG) | — | — | — | — | — | — | — |
|  | TOTAL PHR | 203.8 | 204.2 | 204.4 | 206.1 | 205.8 | 162.872 | 207.65 |
|  | Filler in total | 77 | 77 | 77 | 77 | 77 | 40 | 75 |
| 6PPD content (% by mass) |  | 0.981 | 1.175 | 1.272 | 1.601 | 1.944 | 1.474 | 1.686 |

|  |  | Base formulation | | | | JLB formulation | |
| --- | --- | --- | --- | --- | --- | --- | --- |
|  |  | C | D | E | F | A | B |
| Formulation (parts by mass) | NR | 70 | 70 | 70 | 70 | 70 | 70 |
|  | SBR | — | — | — | — | 30 | 30 |
|  | BR1 (BR1250H) | 15 | 15 | 15 | 15 | — | — |
|  | BR2 (VCR617) | 15 | 15 | 15 | 15 | — | — |
|  | Carbon black 1 (N351) | 20 | 20 | 20 | 20 | 45 | 35 |
|  | Carbon black 2 (N220) | — | — | — | — | — | — |
|  | Silica | 30 | 30 | 30 | 30 | — | 10 |
|  | Silane coupling agent | 1.8 | 1.8 | 1.8 | 1.8 | — | — |
|  | Antioxidant 1 (6PPD) | 3.5 | 3.5 | 3.5 | 3.5 | — | 0.5 |
|  | Antioxidant 2 | 1 | 1 | 1 | 1 | 2 | 1.5 |
|  | Petroleum-derived wax | 1.5 | 1.5 | 1.5 | 1.5 | — | — |
|  | Surfactant | — | 1.5 | — | — | — | — |
|  | Naturally occurring wax | — | — | 1.5 | 2.5 | — | — |
|  | Zinc oxide | 3 | 3 | 3 | 3 | 7 | 7 |
|  | SUMIKANOL 620 | — | — | — | — | 1 | 1.5 |
|  | Oil | 2 | 2 | 2 | 2 | — | — |
|  | Phenolic resin | 2 | 2 | 2 | 2 | — | — |
|  | Stearic acid | 2 | 2 | 2 | 2 | 3 | 3 |
|  | SUMIKANOL 507A | — | — | — | — | 1.5 | 2 |
|  | 10% oil-containing insoluble sulfur | 2.8 | 2.8 | 2.8 | 2.8 | 3.75 | 3.13 |
|  | Vulcanization accelerator 1 (TBBS) | 1.8 | 1.8 | 1.8 | 1.8 | 1 | 1 |
|  | Vulcanization accelerator 2 (DPG) | 0.7 | 0.7 | 0.7 | 0.7 | — | — |
|  | TOTAL PHR | 172.1 | 173.6 | 173.6 | 174.6 | 164.25 | 164.63 |
|  | Filler in total | 50 | 50 | 50 | 50 | 45 | 45 |
| 6PPD content (% by mass) |  | 2.034 | 2.016 | 2.016 | 2.005 | 0 | 0.304 |

TABLE 2

|  |  | Ex. 1 | Com. 1 | Com. 2 | Com. 3 | Com. 4 | Com. 5 | Com. 6 |
|---|---|---|---|---|---|---|---|---|
| Sub-tread structure | Sub-tread thickness (mm) at base of main groove | 1.2 | 2.4 | 2.4 | 2.4 | 2.4 | 2.4 | 1.9 |
|  | Rubber thickness (mm) of cap tread at base of main groove | 0.5 | 1.0 | 1.0 | 1.0 | 1.0 | 1.0 | 0.6 |
|  | Rubber thickness (mm) of base tread at base of main groove | 0.3 | 1.0 | 1.0 | 1.0 | 1.0 | 0.9 | 0.9 |
|  | Rubber thickness (mm) of undertread at base of main groove | 0.3 | 0.3 | 0.3 | 0.3 | 0.3 | 0.4 | 0.3 |
|  | Rubber thickness (mm) of upper layer of jointless band at base of main groove | 0.1 | 0.1 | 0.1 | 0.1 | 0.1 | 0.1 | 0.1 |
|  | JLB formulation | A | A | A | A | A | A | A |
|  | Cap formulation | A | A | D | E | A | D | A |
|  | Amount (% by mass) of phenylenediamine antioxidant in cap formulation | 0.981 | 0.981 | 1.601 | 1.944 | 0.981 | 1.601 | 0.981 |
|  | Base formulation | A | A | A | A | B | B | B |
|  | Amount (% by mass) of phenylenediamine antioxidant in base formulation | 1.474 | 1.474 | 1.474 | 1.474 | 1.686 | 1.686 | 1.686 |
|  | Calculated total amount (% by mass) of phenylenediamine antioxidant | 1.36 | 1.02 | 1.28 | 1.42 | 1.11 | 1.30 | 1.11 |
| Evaluation results | TGC resistance (target ≥100) | 110 | 95 | 105 | 115 | 95 | 105 | 80 |
|  | Tread discoloration (target ≥90) | 100 | 100 | 85 | 60 | 100 | 85 | 100 |
| U/T formulation (parts by mass) | NR | 100 | 100 | 100 | 100 | 100 | 100 | 100 |
|  | IR | — | — | — | — | — | — | — |
|  | Carbon black 1 (N351) | 65 | 65 | 65 | 65 | 65 | 65 | 65 |
|  | Silica | — | — | — | — | — | — | — |
|  | Filler in total | 65 | 65 | 65 | 65 | 65 | 65 | 65 |
|  | Antioxidant 1 (6PPD) | 6 | — | — | — | — | — | — |
|  | Antioxidant 2 | 2 | 2 | 2 | 2 | 2 | 2 | 2 |
|  | Naturally occurring wax | — | — | — | — | — | — | — |
|  | Zinc oxide | 6 | 6 | 6 | 6 | 6 | 6 | 6 |
|  | Oil | — | — | — | — | — | — | — |
|  | Phenolic resin | 2 | 2 | 2 | 2 | 2 | 2 | 2 |
|  | Stearic acid | 1.3 | 1.3 | 1.3 | 1.3 | 1.3 | 1.3 | 1.3 |
|  | Cobalt stearate | — | — | — | — | — | — | — |
|  | 10% oil-containing insoluble sulfur | — | — | — | — | — | — | — |
|  | 20% oil-containing insoluble sulfur | 6.25 | 6.25 | 6.25 | 6.25 | 6.25 | 6.25 | 6.25 |
|  | (Total net sulfur of the above) | 5.00 | 5.00 | 5.00 | 5.00 | 5.00 | 5.00 | 5.00 |
|  | Vulcanization accelerator 1 (TBBS) | 0.8 | 0.8 | 0.8 | 0.8 | 0.8 | 0.8 | 0.8 |
|  | TOTAL PHR | 259.35 | 253.35 | 253.35 | 253.35 | 253.35 | 253.35 | 253.35 |
|  | Amount (% by mass) of phenylenediamine antioxidant | 2.31 | — | — | — | — | — | — |

|  |  | Com. 7 | Com. 8 | Com. 9 | Com. 10 | Ex. 2 | Ex. 3 | Ex. 4 |
|---|---|---|---|---|---|---|---|---|
| Sub-tread structure | Sub-tread thickness (mm) at base of main groove | 1.2 | 0.9 | 0.9 | 0.9 | 1.2 | 2.0 | 1.0 |
|  | Rubber thickness (mm) of cap tread at base of main groove | 0.5 | 0.5 | 0.5 | 0.5 | 0.6 | 1.0 | 0.5 |
|  | Rubber thickness (mm) of base tread at base of main groove | 0.3 | 0 | 0 | 0.3 | 0 | 0.4 | 0 |
|  | Rubber thickness (mm) of undertread at base of main groove | 0.3 | 0.3 | 0.3 | 0 | 0.5 | 0.5 | 0.4 |
|  | Rubber thickness (mm) of upper layer of jointless band at base of main groove | 0.1 | 0.1 | 0.1 | 0.1 | 0.1 | 0.1 | 0.1 |
|  | JLB formulation | A | A | A | A | A | A | A |
|  | Cap formulation | A | D | E | E | A | A | A |
|  | Amount (% by mass) of phenylenediamine antioxidant in cap formulation | 0.981 | 1.601 | 1.944 | 1.944 | 0.981 | 0.981 | 0.981 |
|  | Base formulation | B | — | — | B | — | A | — |
|  | Amount (% by mass) of phenylenediamine antioxidant in base formulation | 1.686 | — | — | 1.686 | — | 1.474 | — |
|  | Calculated total amount (% by mass) of phenylenediamine antioxidant | 0.83 | 1.09 | 1.28 | 1.64 | 1.45 | 1.36 | 1.42 |
| Evaluation results | TGC resistance (target ≥100) | 75 | 85 | 83 | 100 | 115 | 115 | 112 |
|  | Tread discoloration (target ≥90) | 100 | 85 | 70 | 65 | 100 | 100 | 100 |
| U/T formulation (parts by mass) | NR | 100 | 100 | 100 | — | 100 | 100 | 100 |
|  | IR | — | — | — | — | — | — | — |
|  | Carbon black 1 (N351) | 65 | 65 | 65 | | 65 | 65 | 65 |
|  | Silica | — | — | — | | — | — | — |
|  | Filler in total | 65 | 65 | 65 | | 65 | 65 | 65 |
|  | Antioxidant 1 (6PPD) | — | 1.5 | 1.5 | | 6 | 6 | 6 |
|  | Antioxidant 2 | 2 | 2 | 2 | | 2 | 2 | 2 |
|  | Naturally occurring wax | — | — | — | | — | — | — |
|  | Zinc oxide | 6 | 6 | 6 | | 6 | 6 | 6 |
|  | Oil | — | — | — | | — | — | — |
|  | Phenolic resin | 2 | 2 | 2 | | 2 | 2 | 2 |
|  | Stearic acid | 1.3 | 1.3 | 1.3 | | 1.3 | 1.3 | 1.3 |
|  | Cobalt stearate | — | — | — | | — | — | — |
|  | 10% oil-containing insoluble sulfur | — | — | — | | — | — | — |

TABLE 2-continued

|  |  |  |  |  |  |  |  |
|---|---|---|---|---|---|---|---|
| 20% oil-containing insoluble sulfur | 6.25 | 6.25 | 6.25 |  | 6.25 | 6.25 | 6.25 |
| (Total net sulfur of the above) | 5.00 | 5.00 | 5.00 |  | 5.00 | 5.00 | 5.00 |
| Vulcanization accelerator 1 (TBBS) | 0.8 | 0.8 | 0.8 |  | 0.8 | 0.8 | 0.8 |
| TOTAL PHR | 253.35 | 254.85 | 254.85 |  | 259.35 | 259.35 | 259.35 |
| Amount (% by mass) of phenylenediamine antioxidant | — | 0.59 | 0.59 |  | 2.31 | 2.31 | 2.31 |

|  |  | Ex. 5 | Ex. 6 | Ex. 7 | Ex. 8 | Ex. 9 | Ex. 10 |
|---|---|---|---|---|---|---|---|
| Sub-tread structure | Sub-tread thickness (mm) at base of main groove | 2.0 | 0.7 | 1.2 | 1.2 | 1.0 | 1.3 |
|  | Rubber thickness (mm) of cap tread at base of main groove | 1.0 | 0.3 | 0.6 | 0.6 | 0.5 | 0.4 |
|  | Rubber thickness (mm) of base tread at base of main groove | 0.5 | 0 | 0 | 0.2 | 0 | 0.3 |
|  | Rubber thickness (mm) of undertread at base of main groove | 0.4 | 0.3 | 0.5 | 0.3 | 0.4 | 0.5 |
|  | Rubber thickness (mm) of upper layer of jointless band at base of main groove | 0.1 | 0.1 | 0.1 | 0.1 | 0.1 | 0.1 |
|  | JLB formulation | A | A | A | A | A | A |
|  | Cap formulation | A | D | D | D | A | D |
|  | Amount (% by mass) of phenylenediamine antioxidant in cap formulation | 0.981 | 1.601 | 1.601 | 1.601 | 0.981 | 1.601 |
|  | Base formulation | B | — | — | B | — | B |
|  | Amount (% by mass) of phenylenediamine antioxidant in base formulation | 1.686 | — | — | 1.686 | — | 1.686 |
|  | Calculated total amount (% by mass) of phenylenediamine antioxidant | 1.37 | 1.68 | 1.45 | 1.47 | 2.00 | 2.34 |
| Evaluation results | TGC resistance (target ≥100) | 115 | 100 | 110 | 105 | 125 | 130 |
|  | Tread discoloration (target ≥90) | 100 | 100 | 95 | 95 | 100 | 100 |
| U/T formulation (parts by mass) | NR | 100 | 100 | 100 | 100 | 80 | 80 |
|  | IR | — | — | — | — | 20 | 20 |
|  | Carbon black 1 (N351) | 65 | 65 | 65 | 65 | 65 | 65 |
|  | Silica | — | — | — | — | — | — |
|  | Filler in total | 65 | 65 | 65 | 65 | 65 | 65 |
|  | Antioxidant 1 (6PPD) | 6 | 6 | 4 | 4 | 10 | 10 |
|  | Antioxidant 2 | 2 | 2 | 2 | 2 | 2 | 2 |
|  | Naturally occurring wax | — | — | — | — | — | — |
|  | Zinc oxide | 6 | 6 | 6 | 6 | 6 | 6 |
|  | Oil | — | — | — | — | — | — |
|  | Phenolic resin | 2 | 2 | 2 | 2 | 3 | 3 |
|  | Stearic acid | 1.3 | 1.3 | 1.3 | 1.3 | 1.3 | 1.3 |
|  | Cobalt stearate | — | — | — | — | — | — |
|  | 10% oil-containing insoluble sulfur | — | — | — | — | — | — |
|  | 20% oil-containing insoluble sulfur | 6.25 | 6.25 | 6.25 | 6.25 | 6.25 | 6.25 |
|  | (Total net sulfur of the above) | 5.00 | 5.00 | 5.00 | 5.00 | 5.00 | 5.00 |
|  | Vulcanization accelerator 1 (TBBS) | 0.8 | 0.8 | 0.8 | 0.8 | 0.8 | 0.8 |
|  | TOTAL PHR | 259.35 | 259.35 | 257.35 | 257.35 | 264.35 | 264.35 |
|  | Amount (% by mass) of phenylenediamine antioxidant | 2.31 | 2.31 | 1.55 | 1.55 | 3.78 | 3.78 |

TABLE 3

|  |  | Ex. 11 | Ex. 12 | Ex. 13 | Ex. 14 | Ex. 15 | Ex. 16 | Com. Ex. 11 | Com. Ex. 12 |
|---|---|---|---|---|---|---|---|---|---|
| Sub-tread structure | Sub-tread thickness (mm) at base of main groove | 1.2 | 1.2 | 1.2 | 1.2 | 1.4 | 1.2 | 0.9 | 0.9 |
|  | Rubber thickness (mm) of cap tread at base of main groove | 0.6 | 0.6 | 0.6 | 0.6 | 0.6 | 0.6 | 0.5 | 0.6 |
|  | Rubber thickness (mm) of base tread at base of main groove | 0 | 0 | 0 | 0 | 0 | 0 | 0.3 | 0.2 |
|  | Rubber thickness (mm) of undertread at base of main groove | 0.5 | 0.5 | 0.5 | 0.5 | 0.7 | 0.5 | 0 | 0 |
|  | Rubber thickness (mm) of upper layer of jointless band at base of main groove | 0.1 | 0.1 | 0.1 | 0.1 | 0.1 | 0.1 | 0.1 | 0.1 |
|  | JLB formulation | A | A | A | A | A | A | A | A |
|  | Cap formulation | A | A | A | A | A | A | B | C |
|  | Amount (% by mass) of phenylenediamine antioxidant in cap formulation | 0.981 | 0.981 | 0.981 | 0.981 | 0.981 | 0.981 | 1.175 | 1.272 |
|  | Base formulation | — | — | — | — | — | — | C | C |
|  | Amount (% by mass) of phenylenediamine antioxidant in base formulation | — | — | — | — | — | — | 2.034 | 2.034 |
|  | Calculated total amount (% by mass) of phenylenediamine antioxidant | 1.48 | 1.47 | 1.45 | 1.61 | 1.37 | 1.45 | 1.33 | 1.30 |
| Evaluation results | TGC resistance (target ≥100) | 135 | 130 | 120 | 135 | 102 | 120 | 95 | 98 |
|  | Tread discoloration (target ≥90) | 100 | 100 | 100 | 100 | 95 | 105 | 90 | 85 |
| U/T formulation (parts by mass) | NR | 100 | 100 | 100 | 90 | 80 | 100 | — | — |
|  | IR | — | — | — | 10 | 20 | — |  |  |
|  | Carbon black 1 (N351) | 65 | 65 | 65 | 40 | 86 | 65 |  |  |
|  | Silica | — | — | — | 10 | — | — |  |  |

TABLE 3-continued

|  |  |  |  |  |  |  |
|---|---|---|---|---|---|---|
| Filler in total | 65 | 65 | 65 | 50 | 86 | 65 |
| Antioxidant 1 (6PPD) | 6 | 6 | 6 | 6 | 6 | 6 |
| Antioxidant 2 | 2 | 2 | 2 | 2 | 2 | 2 |
| Naturally occurring wax | — | — | — | — | — | 2 |
| Zinc oxide | 6 | 7 | 8 | 6 | 3 | 6 |
| Oil | — | — | — | — | 25 | — |
| Phenolic resin | 2 | 2 | 2 | 2 | 2 | 2 |
| Stearic acid | 1.3 | 1.3 | 1.3 | 1.3 | 1.3 | 1.3 |
| Cobalt stearate | — | — | — | — | — | — |
| 10% oil-containing insoluble sulfur | — | — | — | — | 2.45 | — |
| 20% oil-containing insoluble sulfur | 2.5 | 3.75 | 5.63 | 2.5 | — | 6.25 |
| (Total net sulfur of the above) | 2.00 | 3.00 | 4.50 | 2.00 | 2.21 | 5.00 |
| Vulcanization accelerator 1 (TBBS) | 1.2 | 0.8 | 0.8 | 1.2 | 1.2 | 0.8 |
| TOTAL PHR | 253.00 | 255.85 | 260.234 | 223.00 | 317.155 | 261.35 |
| Amount (% by mass) of phenylenediamine antioxidant | 2.37 | 2.35 | 2.31 | 2.69 | 1.89 | 2.30 |

|  |  | Ex. 17 | Ex. 18 | Ex. 19 | Ex. 20 | Ex. 21 | Ex. 22 | Ex. 23 |
|---|---|---|---|---|---|---|---|---|
| Sub-tread structure | Sub-tread thickness (mm) at base of main groove | 1.2 | 2.0 | 1.7 | 1.2 | 1.2 | 1.2 | 1.2 |
|  | Rubber thickness (mm) of cap tread at base of main groove | 0.5 | 0.7 | 1.3 | 0.5 | 0.5 | 0.5 | 0.6 |
|  | Rubber thickness (mm) of base tread at base of main groove | 0.6 | 1.2 | 0.3 | 0.6 | 0.6 | 0.6 | 0 |
|  | Rubber thickness (mm) of undertread at base of main groove | 0 | 0 | 0 | 0 | 0 | 0 | 0.5 |
|  | Rubber thickness (mm) of upper layer of jointless band at base of main groove | 0.1 | 0.1 | 0.1 | 0.1 | 0.1 | 0.1 | 0.1 |
|  | JLB formulation | A | A | A | A | A | A | B |
|  | Cap formulation | D | A | D | D | D | D | A |
|  | Amount (% by mass) of phenylenediamine antioxidant in cap formulation | 1.601 | 0.981 | 1.601 | 1.601 | 1.601 | 1.601 | 0.981 |
|  | Base formulation | C | C | C | D | E | F | — |
|  | Amount (% by mass) of phenylenediamine antioxidant in base formulation | 2.034 | 2.034 | 2.034 | 2.016 | 2.016 | 2.005 | — |
|  | Calculated total amount (% by mass) of phenylenediamine antioxidant | 1.68 | 1.56 | 1.58 | 1.68 | 1.68 | 1.67 | 1.48 |
| Evaluation results | TGC resistance (target ≥100) | 112 | 112 | 110 | 125 | 125 | 125 | 135 |
|  | Tread discoloration (target ≥90) | 100 | 100 | 105 | 100 | 100 | 105 | 100 |
| U/T formulation (parts by mass) | NR | — | — | — | — | — | — | 100 |
|  | IR |  |  |  |  |  |  | — |
|  | Carbon black 1 (N351) |  |  |  |  |  |  | 65 |
|  | Silica |  |  |  |  |  |  | — |
|  | Filler in total |  |  |  |  |  |  | 65 |
|  | Antioxidant 1 (6PPD) |  |  |  |  |  |  | 6 |
|  | Antioxidant 2 |  |  |  |  |  |  | 2 |
|  | Naturally occurring wax |  |  |  |  |  |  | — |
|  | Zinc oxide |  |  |  |  |  |  | 6 |
|  | Oil |  |  |  |  |  |  | — |
|  | Phenolic resin |  |  |  |  |  |  | 2 |
|  | Stearic acid |  |  |  |  |  |  | 1.3 |
|  | Cobalt stearate |  |  |  |  |  |  | — |
|  | 10% oil-containing insoluble sulfur |  |  |  |  |  |  | — |
|  | 20% oil-containing insoluble sulfur |  |  |  |  |  |  | 2.5 |
|  | (Total net sulfur of the above) |  |  |  |  |  |  | 2.00 |
|  | Vulcanization accelerator 1 (TBBS) |  |  |  |  |  |  | 1.2 |
|  | TOTAL PHR |  |  |  |  |  |  | 253.00 |
|  | Amount (% by mass) of phenylenediamine antioxidant |  |  |  |  |  |  | 2.37 |

TABLE 4

|  |  | Amount of normal alkane according to carbon number (in wax) Petroleum-derived wax (Trial product) |
|---|---|---|
| Carbon number of normal alkanes | 19 | 0.1 |
|  | 20 | 0.29 |
|  | 21 | 0.68 |
|  | 22 | 1.31 |
|  | 23 | 2.32 |
|  | 24 | 3.3 |
|  | 25 | 4.14 |
|  | 26 | 4.38 |
|  | 27 | 4.58 |
|  | 28 | 3.92 |
|  | 29 | 3.92 |
|  | 30 | 3.61 |
|  | 31 | 4.16 |
|  | 32 | 4.13 |
|  | 33 | 4.59 |
|  | 34 | 4.32 |

TABLE 4-continued

| | Amount of normal alkane according to carbon number (in wax) Petroleum-derived wax (Trial product) |
|---|---|
| 35 | 4.7 |
| 36 | 4.47 |
| 37 | 4.31 |
| 38 | 3.71 |
| 39 | 3.3 |
| 40 | 2.88 |
| 41 | 2.48 |
| 42 | 2.09 |
| 43 | 1.7 |
| 44 | 1.42 |
| 45 | 1.13 |
| 46 | 0.9 |
| 47 | 0.72 |
| 48 | 0.56 |
| 49 | 0.42 |
| 50 | 0.35 |
| 51 | 0.23 |
| 52 | 0.17 |
| 53 | 0.12 |
| 54 | 0.09 |
| 55 | 0.06 |
| Amount of C20 to C32 normal alkanes (% by mass) | 40.7 |
| Amount of C33 to C44 normal alkanes (% by mass) | 40.0 |
| Amount of C45 to C47 normal alkanes (% by mass) | 2.8 |
| Amount of C48 and higher normal alkanes (% by mass) | 2.0 |
| Amount of iso-components (% by mass) | 14.5 |

The pneumatic tires of the examples included a tread portion including a jointless band and at least two tire components selected from the group consisting of a cap tread, abase tread, and an undertread. The cap tread, the base tread, and the undertread were formed from a rubber composition for cap treads, a rubber composition for base treads, and a rubber composition for undertreads, respectively, and the jointless band included fiber cords coated with a rubber composition for fiber cord toppings. The rubber composition for cap treads had an amount of phenylenediamine antioxidant of 1.5% by mass or less. The cap tread, the base tread, the undertread, and the upper layer of the jointless band had amounts of phenylenediamine antioxidant satisfying a specific relational expression. The rubber composition for undertreads contained, per 100 parts by mass of the rubber component, 1.8 to 6.0 parts by mass of sulfur. Though having a sub-tread thickness at the base of the tread main groove of as small as 0.5 to 2.0 mm, these tires were prevented from discoloration while exhibiting good TGC resistance even after the tires were stored.

The invention claimed is:
1. A pneumatic tire, comprising a tread portion,
the tread portion comprising a jointless band, a cap tread, and at least one tire component selected from the group consisting of a base tread and an undertread,
the cap tread, the base tread, and the undertread being formed from a rubber composition for cap treads, a rubber composition for base treads, and a rubber composition for undertreads, respectively,
the jointless band comprising fiber cords coated with a rubber composition for fiber cord toppings,
the rubber composition for cap treads having an amount of phenylenediamine antioxidant of 1.8% by mass or less,
the cap tread, the base tread, the undertread, and an upper layer of the jointless band having amounts of phenylenediamine antioxidant satisfying Expression (I) below,
the rubber composition for undertreads comprising, per 100 parts by mass of a rubber component, 1.8 to 6.0 parts by mass of sulfur, and
the pneumatic tire having a sub-tread thickness at the base of a tread main groove of 0.5 to 2.0 mm,

1.35≤{(rubber thickness (mm) of cap tread at base of tread main groove)×(amount (% by mass) of phenylenediamine antioxidant in rubber composition for cap treads)+(rubber thickness (mm) of base tread at base of tread main groove)×(amount (% by mass) of phenylenediamine antioxidant in rubber composition for base treads)+(rubber thickness (mm) of undertread at base of tread main groove)×(amount (% by mass) of phenylenediamine antioxidant in rubber composition for undertreads)+(rubber thickness (mm) of upper layer of jointless band at base of tread main groove)×(amount (% by mass) of phenylenediamine antioxidant in rubber composition for fiber cord toppings)}/(sub-tread thickness (mm) at base of tread main groove)   Expression (I).

2. The pneumatic tire according to claim 1, wherein the tread portion comprises the cap tread, the base tread, and the jointless band.
3. The pneumatic tire according to claim 1, wherein at least one of the base tread or the undertread has a rubber thickness at the base of a tread main groove of 0.1 to 1.5 mm.
4. The pneumatic tire according to claim 1, wherein at least one of the rubber composition for base treads or the rubber composition for undertreads comprises substantially no cobalt metal.
5. The pneumatic tire according to claim 1, wherein at least one of the rubber composition for base treads or the rubber composition for undertreads comprises, per 100 parts by mass of a rubber component, 0.1 to 5.0 parts by mass of a phenolic resin.
6. The pneumatic tire according to claim 1, wherein at least one of the rubber composition for cap treads or the rubber composition for base treads comprises, per 100 parts by mass of a rubber component, 0.01 to 5.0 parts by mass of a nonionic surfactant.
7. The pneumatic tire according to claim 6, wherein the nonionic surfactant is at least one selected from the group consisting of a Pluronic-type nonionic surfactant and at least one of nonionic surfactants represented by the following Formula (1) or Formula (2):

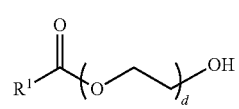
(1)

wherein R¹ represents a C6-C26 hydrocarbon group, and d represents an integer;

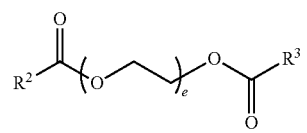
(2)

wherein $R^2$ and $R^3$ are the same or different and each represent a C6-26 hydrocarbon group, and e represents an integer.

8. The pneumatic tire according to claim 1, wherein at least one of the rubber composition for base treads or the rubber composition for undertreads comprises, per 100 parts by mass of a rubber component, 0.1 to 5.0 parts by mass of a naturally occurring wax containing 40 to 98% by mass of an ester component.

9. The pneumatic tire according to claim 8, wherein the naturally occurring wax is extracted from a gramineous plant and comprises a component having a softening point of 60° C. to 90° C.

* * * * *